US011944906B2

(12) United States Patent
Takahashi et al.

(10) Patent No.: US 11,944,906 B2
(45) Date of Patent: Apr. 2, 2024

(54) VIDEO MODIFICATION AND TRANSMISSION USING TOKENS

(71) Applicant: GREE, Inc., Tokyo (JP)

(72) Inventors: Naoki Takahashi, Tokyo (JP); Kai Sato, Tokyo (JP); Yosuke Kanaya, Tokyo (JP)

(73) Assignee: GREE, Inc., Tokyo (JP)

( * ) Notice: Subject to any disclaimer, the term of this patent is extended or adjusted under 35 U.S.C. 154(b) by 0 days.

(21) Appl. No.: 18/074,379

(22) Filed: Dec. 2, 2022

(65) Prior Publication Data

US 2023/0109706 A1 Apr. 13, 2023

Related U.S. Application Data

(63) Continuation of application No. 17/092,084, filed on Nov. 6, 2020, now Pat. No. 11,559,745.

(51) Int. Cl.
*A63F 13/65* (2014.01)
*A63F 13/211* (2014.01)
*H04N 21/81* (2011.01)

(52) U.S. Cl.
CPC ............ *A63F 13/65* (2014.09); *A63F 13/211* (2014.09); *H04N 21/816* (2013.01)

(58) Field of Classification Search
CPC ...... A63F 13/65; A63F 13/211; A63F 13/213; A63F 13/215; A63F 13/35; A63F 13/69; A63F 13/86; A63F 13/92; H04N 21/816
See application file for complete search history.

(56) References Cited

U.S. PATENT DOCUMENTS 9,814,987 B1 11/2017 Lawson et al.
10,130,890 B2 11/2018 Oshima et al.
(Continued)

FOREIGN PATENT DOCUMENTS

JP 2012034792 A 2/2012
JP 6378849 B1 8/2018
(Continued)

OTHER PUBLICATIONS

"Akiba's Trip2 'Demo Mode'", document dated Jun. 24, 2014, downloaded from https://www.famitsu.com/news/201406/24055841.html on Aug. 24, 2021.
(Continued)

*Primary Examiner* — David L Lewis
*Assistant Examiner* — Shauna-Kay Hall
(74) *Attorney, Agent, or Firm* — Klarquist Sparkman, LLP

(57) ABSTRACT

Modified video is distributed to a viewer of a computer-implemented game by causing a processor to distribute, toward a terminal device of a viewer, a first video including an animation of a first avatar of a distributor generated based on motion data; distribute, toward the terminal device, a second video related to a computer-implemented game generated with operation data using a received web page; receive, from the terminal device, token data indicative of a token sent to the distributor from the viewer during execution of one unit section of the game; and distribute, toward the terminal device, the second video including, during one time section occurring after the one unit section of the game ends and before a next unit section of the game begins, a rendering of a token object selected based on the token data.

15 Claims, 18 Drawing Sheets

(56) References Cited

U.S. PATENT DOCUMENTS

| | | | |
|---|---|---|---|
| 11,044,535 | B2 | 6/2021 | Kurabuchi |
| 11,065,540 | B2 | 7/2021 | Chino |
| 11,559,740 | B2 | 1/2023 | Kurabuchi et al. |
| 11,559,745 | B2 | 1/2023 | Takahashi et al. |
| 2003/0220143 | A1 | 11/2003 | Shteyn et al. |
| 2007/0268312 | A1 | 11/2007 | Marks et al. |
| 2008/0001951 | A1 | 1/2008 | Marks et al. |
| 2009/0328122 | A1 | 12/2009 | Amento et al. |
| 2011/0078578 | A1* | 3/2011 | Calis ............... G06Q 30/02 715/740 |
| 2016/0006772 | A1 | 1/2016 | Shimizu |
| 2016/0286275 | A1 | 9/2016 | Maeda et al. |
| 2017/0003740 | A1 | 1/2017 | Verfaillie et al. |
| 2017/0011554 | A1 | 1/2017 | Burba et al. |
| 2017/0072324 | A1 | 3/2017 | Navok et al. |
| 2018/0093185 | A1 | 4/2018 | Black et al. |
| 2018/0253897 | A1* | 9/2018 | Satake ............ A63F 13/215 |
| 2019/0099675 | A1* | 4/2019 | Khan ............... A63F 13/212 |
| 2019/0102929 | A1 | 4/2019 | Davis et al. |
| 2020/0005541 | A1 | 1/2020 | Preston |
| 2020/0023280 | A1 | 1/2020 | Onda et al. |
| 2020/0077157 | A1 | 3/2020 | Kurabuchi |
| 2021/0077905 | A1 | 3/2021 | Kurabuchi et al. |
| 2021/0138347 | A1 | 5/2021 | Takahashi et al. |
| 2021/0152894 | A1 | 5/2021 | Kurabuchi |
| 2023/0109706 | A1 | 4/2023 | Takahashi et al. |

FOREIGN PATENT DOCUMENTS

| | | |
|---|---|---|
| JP | 2018-171283 A | 11/2018 |
| JP | 6473252 B | 2/2019 |
| JP | 6491388 B1 | 3/2019 |
| JP | 2019-054838 A | 4/2019 |
| JP | 2019-103596 A | 6/2019 |
| JP | 2019-118656 A | 7/2019 |
| JP | 2021-137600 A | 9/2021 |
| WO | WO-2018142494 A1 | 9/2018 |

OTHER PUBLICATIONS

Gapsis editorial department, "The games users are able to play by operating their avatars with Line will be launched," downloaded from https://www.gapsis.jp/2013/05/line-turitomo.html, 7 pp., May 17, 2013 (English translation attached.).

"Let's All Participate in the World of Arisugawa Dot!," document dated Jan. 13, 2019, downloaded from https://jonasan72.hatenablog.com/entry/2019/01/165838 on Aug. 25, 2021.

Mirrativ, Inc., "A gift function has been launched!," downloaded from https://web.archive.org/web/20181214025245/https://mirrativtmbr.tumblr.com/post/178631446973ギフト機能がはじまります , 8 pp., Dec. 14, 2018 (English translation attached.).

Mirrativ, Inc., "Game distribution & game commentary & game recording," downloaded from https://apps.apple.com/jp/app/mirrativ-ミラティブ-スマホ でかんたんゲーム配信/id1028944599, 7 pp., Nov. 10, 2020 (English translation attached.).

Notice of Reasons for Refusal dated Oct. 6, 2020, for Japanese Patent Application No. 2019-166968, 6 pp. (English translation attached.).

Notice of Reasons for Refusal dated Oct. 6, 2020, for Japanese Patent Application No. 2019-166971, 7 pp. (English translation attached.).

Notice of Reasons for Refusal dated Jan. 12, 2021, for Japanese Patent Application No. 2019-202987, 8 pp. (English translation attached.).

Office action (with English Translation) issued in JP 2019-202987, dated Aug. 10, 2021, 7 pages.

Office Action (w/ English Translation) issued in JP 2020-184501, dated Dec. 21, 2021, 4 pages.

Office Action from U.S. Appl. No. 17/017,636, dated May 12, 2022, 24 pages.

Reality Administration Bureau, "Flappin' Avatar," downloaded from https://reality-notice.wrightflyer.net/aba0a23e90b9c3df9c819fc58bd39f09a0452aac.html, 5 pp., Apr. 1, 2019 (English translation attached.).

Office Action (with English translation) from counterpart Japanese Patent Application No. 2021-084517, dated Jun. 6, 2023, 7 pages.

Japan Patent Application No. 2021-084517.

U.S. Appl. No. 17/017,636.

U.S. Appl. No. 17/092,084; and.

U.S. Appl. No. 18/074,379.

Office Action (with English translation) from the counterpart Japanese Application No. 2022-045550, dated Nov. 7, 2023, 7 pages.

Office Action from U.S. Appl. No. 18/084,434, dated Sep. 28, 2023, 13 pages.

* cited by examiner

| RECEIVED TOKEN(S) | FIRST UNIT SECTION | SECOND UNIT SECTION | THIRD UNIT SECTION |
|---|---|---|---|
| TOKEN A | ×10 | ×8 | ×1 |
| TOKEN B | ×1 | ×9 | ×1 |
| TOKEN C | ×9 | ×10 | ×1 |
| TOKEN D | ×1 | ×1 | ×10 |
| TOKEN E | ×8 | ×1 | ×1→×2 |
| TOKEN F | ×1 | ×1 | ×1→×2 |
| TOKEN G | ×0 | ×1 | ×0 |
| TOKEN H | ×0 | ×1 | ×0 |

| TOKEN OBJECT(S) TO BE DISPLAYED | FIRST TIME SECTION | SECOND TIME SECTION | THIRD TIME SECTION |
|---|---|---|---|
| FIRST TOKEN OBJECT(S) | A, C, E | A, B, C | D, E, F |
| SECOND TOKEN OBJECT(S) | B, D, F | G, H, D | A, B, C |

FIG. 15

VIDEO MODIFICATION AND TRANSMISSION USING TOKENS

CROSS-REFERENCE TO RELATED APPLICATIONS

This application is a continuation of U.S. application Ser. No. 17/092,084, filed on Nov. 6, 2020, entitled "VIDEO MODIFICATION AND TRANSMISSION USING TOKENS," which claims priority to Japanese Patent Application No. 2019-202987, filed on Nov. 8, 2019, entitled "Computer Program, Server Device, and Method." Both applications are incorporated herein by reference in their entirety as if set forth fully herein.

FIELD

The technology disclosed in the present application relates to a computer program, a server device, a terminal device, and a method that are used for distributing a video related to a game from a terminal device of a distributor to a terminal device of a viewer.

BACKGROUND

One example of a service used for distributing a video related to a computer game is known a service called Mirrativ provided on a website identified by the following URL.

https://apps.apple.com/jp/app/mirrativ-
ミラティブ-スマホでかんたんゲーム
配信/id1028944599

With this service, the distributor uses a terminal device to distribute, to the terminal devices of a plurality of viewers, a video including an animation of an avatar generated on the basis of motion data related to the motion of the distributor.

SUMMARY

Method and apparatus for distributing and modifying video in a networked computer environment are disclosed. In some examples of a video streaming service used with computer games, each viewer can exchange data with a distributor including game metadata, comments, video data, audio data, image data, location data, and/or video or game commands. Each viewer can also determine to transmit one or more messages or packets encoded with one or more tokens to the distributor. In the disclosed technology field, such tokens may also be referred to as elective tokens or "gifts." Similarly, token data may be referred to as "gift data." However, the token data and such token packets transmitted by each viewer to the distributor in this way do not affect elements used in the game played and distributed by the distributor, such as game objects or parameters. Therefore, it is difficult for each viewer to have a sense of being involved in the game when viewing video related to the game distributed from the distributor.

Accordingly, one aspect of the disclosed technology provides a computer program, a terminal device, a server device, and a method that can provide a viewer with a sense of being involved in a game. Methods and apparatus are disclosed for modifying and distributing video in a computer network responsive to transmission of token messages transmitted from one or more viewers to a distributor. The viewers can receive video streams or other game elements having modified encodings based on the tokens the viewers elected to transmit. As will be understood to a person of ordinary skill in the art having the benefit of the present disclosure, viewers can elect to send such tokens to indicate a message to the distributor, for example, appreciation or respect for the distributor. Examples of practical applications of the disclosed technologies include but are not limited to: video encoding and transcoding, audio coding and transcoding, and/or enhancement of computer games implemented in a network environment modified responsive to the distributor receiving the token.

Computer-readable storage media according to one aspect of the disclosed technology can be "computer-readable storage media storing computer-readable instructions, which when executed by a computer having at least one processor, cause the computer to: distribute, toward a terminal device of a viewer via a communication line, a first video including an animation of a first avatar of a distributor generated on the basis of motion data or the motion data; distribute, toward the terminal device of the viewer via the communication line, a second video related to a computer-implemented game generated on the basis of operation data by using a received web page; receive, from the terminal device of the viewer via the communication line, token data indicative of a token sent to the distributor from the viewer viewing the second video during execution of one unit section of the game; and distribute, toward the terminal device of the viewer via the communication line, the second video including, during one time section occurring after the one unit section of the game ends and before a next unit section of the game begins, a rendering of a token object selected on the basis of the token data."

A terminal device according to one aspect of the disclosed technology can be a "a terminal device, comprising: at least one processor, wherein the at least one processor: distributes, toward a terminal device of a viewer via a communication line, a first video including an animation of a first avatar of a distributor generated on the basis of motion data or the motion data; distributes, toward the terminal device of the viewer via the communication line, a second video related to a computer-implemented game generated on the basis of operation data by using a received web page; receives, from the terminal device of the viewer via the communication line, gift data indicative of a gift sent to the distributor from the viewer viewing the second video during execution of one unit section of the game; and distributes, toward the terminal device of the viewer via the communication line, the second video including, during one time section occurring after the one unit section of the game ends and before a next unit section of the game begins, a rendering of a gift object selected on the basis of the gift data."

A method according to one aspect of the disclosed technology can be "a computer-implemented method for automatically generating customized video in an interactive network application, the method comprising: with at least one processor: distributing, toward a terminal device of a viewer via a communication line, a first video including an animation of a first avatar of a distributor generated on the basis of motion data or the motion data; distributing, toward the terminal device of the viewer via the communication line, a second video related to a computer-implemented game generated on the basis of operation data by using a received web page; receiving, from the terminal device of the viewer via the communication line, gift data indicative of a gift sent to the distributor from the viewer viewing the second video during execution of one unit section of the game; and distributing, toward the terminal device of the viewer via the communication line, the second video including, during one time section occurring after the one unit section of the game ends and before a next unit section of the game begins, a rendering of a gift object selected on the basis of the gift data."

Computer-readable storage media according to another aspect of the disclosed technology can be "computer-readable storage media storing computer-readable instructions, which when executed by a computer having at least one processor, cause the computer to: distribute, to a terminal device of a viewer via a communication line, a first video including an animation of a first avatar of a distributor generated on the basis of motion data or the motion data; distribute, to the terminal device of the viewer via the communication line, a second video related to a computer-implemented game generated on the basis of operation data by using a received web page; receive, from the terminal device of the viewer via the communication line, gift data indicative of a gift sent to the distributor from the viewer viewing the second video during execution of one unit section of the game; and distribute, to the terminal device of the viewer via the communication line, the second video generated by the terminal of the distributor including, during one time section occurring after the one unit section of the game ends and before a next unit section of the game begins, a rendering of a gift object selected on the basis of the gift data."

A server device according to one aspect of the disclosed technology can be "a server device, comprising: at least one processor, wherein the at least one processor: distributes, to a terminal device of a viewer via a communication line, a first video including an animation of a first avatar of a distributor generated on the basis of motion data or the motion data; distributes, to the terminal device of the viewer via the communication line, a second video related to a computer-implemented game generated on the basis of operation data by using a received web page; receives, from the terminal device of the viewer via the communication line, gift data indicative of a gift sent to the distributor from the viewer viewing the second video during execution of one unit section of the game; and distributes, to the terminal device of the viewer via the communication line, the second video generated by the terminal of the distributor including, during one time section occurring after the one unit section of the game ends and before a next unit section of the game begins, a rendering of a gift object selected on the basis of the gift data."

A method according to another aspect of the disclosed technology can be "a computer-implemented method for automatically generating customized video in an interactive network application, the method comprising: with at least one processor: distributing, to a terminal device of a viewer via a communication line, a first video including an animation of a first avatar of a distributor generated on the basis of motion data or the motion data; distributing, to the terminal device of the viewer via the communication line, a second video related to a computer-implemented game generated on the basis of operation data by using a received web page; receiving, from the terminal device of the viewer via the communication line, gift data indicative of a gift sent to the distributor from the viewer viewing the second video during execution of one unit section of the game; and distributing, to the terminal device of the viewer via the communication line, the second video generated by the terminal of the distributor including, during one time section occurring after the one unit section of the game ends and before a next unit section of the game begins, a rendering of a gift object selected on the basis of the gift data."

Computer-readable storage media according to another aspect of the disclosed technology can be "computer-readable storage media storing computer-readable instructions, which when executed by a computer having at least one processor, cause the computer to: receive, from a terminal device of a distributor via a communication line, a first video including an animation of a first avatar of the distributor generated on the basis of motion data or the motion data; receive, from the terminal device of the distributor via the communication line, a second video related to a computer-implemented game generated on the basis of operation data by using a received web page; and receive, from the terminal device of the distributor via the communication line, the second video including, during one time section occurring after a one unit section of the game ends and before a next unit section of the game begins, a rendering of a gift object selected on the basis of gift data, the gift data being indicative of a gift sent to the distributor from the viewer viewing the second video during execution of the one unit section of the game.

A terminal device of another aspect of the disclosed technology can be "a terminal device, comprising: at least one processor, wherein the at least one processor: receives, from a terminal device of a distributor via a communication line, a first video including an animation of a first avatar of the distributor generated on the basis of motion data or the motion data; receives, from the terminal device of the distributor via the communication line, a second video related to a computer-implemented game generated on the basis of operation data by using a received web page; and receives, from the terminal device of the distributor via the communication line, the second video including, during one time section occurring after a one unit section of the game ends and before a next unit section of the game begins, a rendering of a gift object selected on the basis of gift data, the gift data being indicative of a gift sent to the distributor from the viewer viewing the second video during execution of the one unit section of the game."

A method according to another aspect of the disclosed technology can be "a computer-implemented method for automatically generating customized video in an interactive network application, the method comprising: with at least one processor: receiving, from a terminal device of a distributor via a communication line, a first video including an animation of a first avatar of the distributor generated on the basis of motion data or the motion data; receiving, from the terminal device of the distributor via the communication line, a second video related to a computer-implemented game generated on the basis of operation data by using a received web page; and receiving, from the terminal device of the distributor via the communication line, the second video including, during one time section occurring after a one unit section of the game ends and before a next unit section of the game begins, a rendering of a gift object selected on the basis of gift data, the gift data being indicative of a gift sent to the distributor from the viewer viewing the second video during execution of the one unit section of the game."

A server device according to another aspect of the disclosed technology can be "a server device, comprising at least one processor, wherein the at least one processor: transmits a web page including computer-readable instructions to a terminal device of a distributor, the terminal device being configured to: distribute, toward a terminal device of a viewer via a communication line, a first video including an animation of a first avatar of the distributor generated on the basis of motion data or the motion data; and distribute, toward the terminal device of the viewer via the communication line, a second video related to a computer-implemented game generated on the basis of operation data by using the received web page, wherein the instructions, which when executed by a computer having at least one processor included in the terminal of the distributor, cause the computer to: receive, from the terminal device of the viewer via the communication line, gift data indicative of a gift sent to the distributor from the viewer viewing the second video during execution of one unit section of the game; and distribute, toward the terminal device of the viewer via the communication line, the second video including, during one time section occurring after the one unit section of the game ends and before a next unit section of the game begins, a rendering of a gift object selected on the basis of the gift data."

A method according to another aspect of the disclosed technology can be "a method computer-implemented method for automatically generating customized video in an interactive network application, the method comprising: with at least one processor: transmitting a web page including computer-readable instructions to a terminal device of a distributor, the terminal device being configured to: distribute, toward a terminal device of a viewer via a communication line, a first video including an animation of a first avatar of the distributor generated on the basis of motion data or the motion data; and distribute, toward the terminal device of the viewer via the communication line, a second video related to a computer-implemented game generated on the basis of operation data by using the received web page, wherein the instructions, which when executed by a computer having at least one processor included in the terminal of the distributor, cause the computer to: receive, from the terminal device of the viewer via the communication line, gift data indicative of a gift sent to the distributor from the viewer viewing the second video during execution of one unit section of the game; and distribute, toward the terminal device of the viewer via the communication line, the second video including, during one time section occurring after the one unit section of the game ends and before a next unit section of the game begins, a rendering of a gift object selected on the basis of the gift data."

A system according to one aspect of the disclosed technology can be "a system including first and second terminal devices and a server, wherein the first terminal device is configured to: transmit, toward the second terminal device via the server, a first video including an animation of a first avatar of a distributor generated on the basis of motion data or the motion data; and transmit, toward the second terminal device via the server, a second video related to a computer-implemented game generated on the basis of operation data by using a received web page, wherein the second terminal device is configured to transmit, toward the first terminal device via the server, gift data indicative of a gift sent to the distributor from a viewer viewing the second video during execution of one unit section of the game, wherein the first terminal device is further configured to transmit, toward the second terminal device via the server, the second video including, during one time section occurring after the one unit section of the game ends and before a next unit section of the game begins, a rendering of a gift object selected on the basis of the gift data."

A method according to another aspect of the disclosed technology can be "a method in a system comprising first and second terminal devices and a server, including: the first terminal device transmitting, toward the second terminal device via the server, a first video including an animation of a first avatar of a distributor generated on the basis of motion data or the motion data; the first terminal device transmitting, toward the second terminal device via the server, a second video related to a computer-implemented game generated on the basis of operation data by using a received web page; the second terminal device transmitting, toward the first terminal device via the server, gift data indicative of a gift sent to the distributor from a viewer viewing the second video during execution of one unit section of the game; and the first terminal device transmitting, toward the second terminal device via the server, the second video including, during one time section occurring after the one unit section of the game ends and before a next unit section of the game begins, a rendering of a gift object selected on the basis of the gift data."

This Summary is provided to introduce a selection of concepts in a simplified form that are further described below in the Detailed Description. All trademarks used herein remain the property of their respective owners. This Summary is not intended to identify key features or essential features of the claimed subject matter, nor is it intended to be used to limit the scope of the claimed subject matter. The foregoing and other objects, features, and advantages of the disclosed subject matter will become more apparent from the following Detailed Description, which proceeds with reference to the accompanying figures.

BRIEF DESCRIPTION OF THE DRAWINGS

FIG. 15 is a diagram schematically showing a method of selecting a token object to be displayed in each time section in the video distribution system shown in FIG. 1.

DETAILED DESCRIPTION

Figure 1:
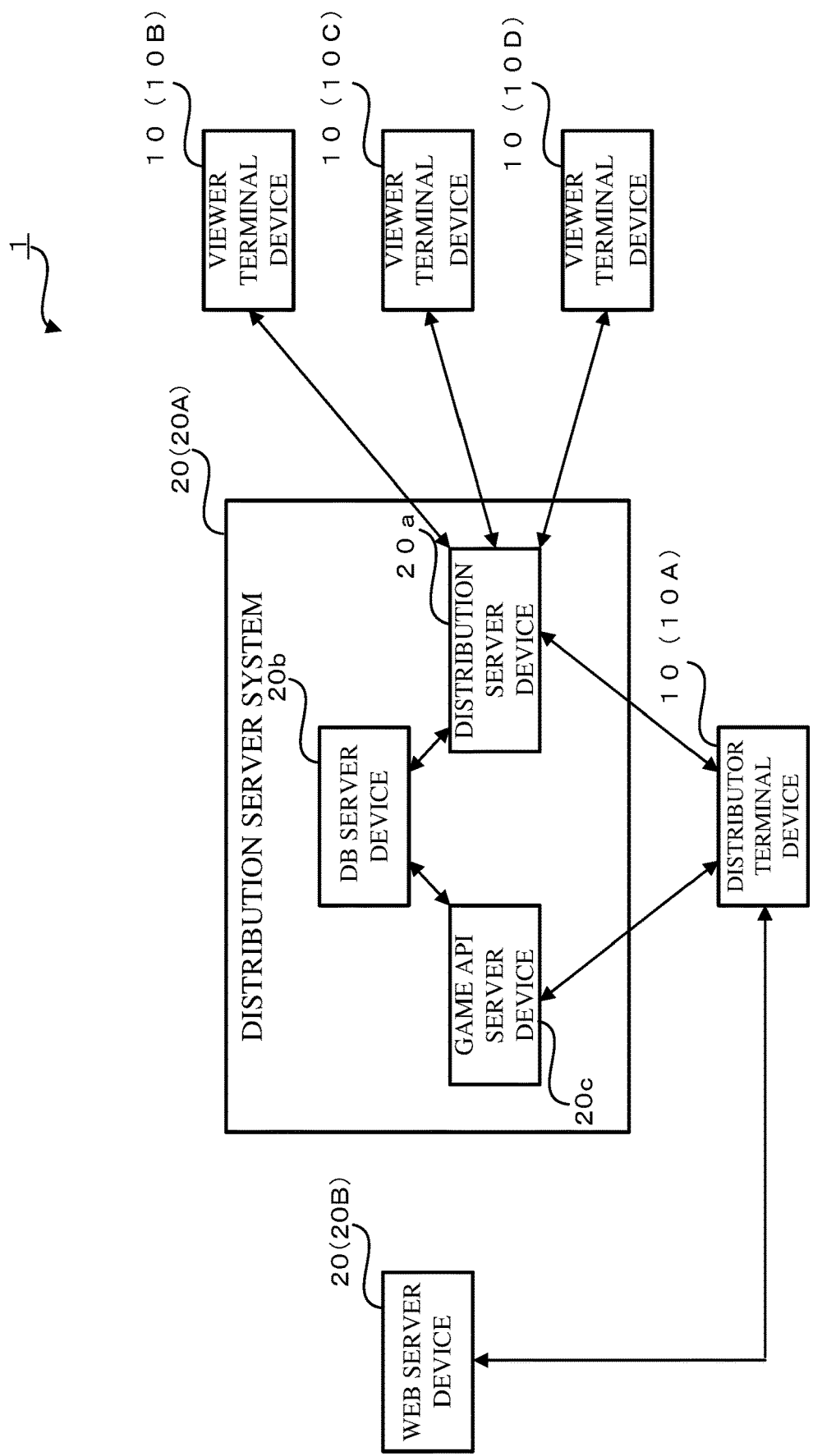
FIG. 1 is a block diagram showing an example of a configuration of a video delivery system according to an embodiment.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," and "distribute" to describe the disclosed methods. These terms are high-level descriptions of the actual operations that are performed. The actual operations that correspond to these terms will vary depending on the particular implementation and are readily discernible by one of ordinary skill in the art having the benefit of the present disclosure.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented using computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as an agent executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

As will be described in further detail herein, certain examples of the disclosed technology can be used in a networked video transmission system to provide interactive applications, such as games, social media, and other forms of interactive communication. In some examples, token data can be transmitted from a viewer terminal device to a distributor terminal device operating concurrently to provide an interactive application. A server at the distributor, or the distributor terminal device itself, can process the data to render modified video data that is encoded and sent to the viewer terminal device. This allows for interactive applications to be processed at the distributor, which can reduce the amount of computing resources required at the viewer terminal devices to render the modified video data locally. Further, in some examples, the modified video data is transmitted not just to the viewer device that sent token data, but can also be transmitted to other viewer devices participating in the interactive application. This can further reduce computing resources required at each of the additional viewer devices or allow for more extensive effects to be added to the transmitted video. In addition, certain disclosed techniques allow security and maintenance operations associated with interactive applications such as game programs to be performed at the distributor, further reducing complexity of the application.

1. Configuration of Video Distribution System

Examples of video distribution systems disclosed in the present application enable a user who performs video distribution over a computer network (hereinafter referred to as "distributor") to transmit (or "distribute"), by using a terminal device of the distributor, a first video including an animation of a first avatar generated on the basis of motion data generated by motion capture of video or other image data captured of the distributor and a second video related to a computer-implemented game generated on the basis of operation data related to the operation of the distributor to a terminal device of a user who views the videos (hereinafter referred to as "viewer") via a computer network communication line. Transmission via the communication line can include wired and/or wireless forms of signal transmission. In other examples, only the motion data, or both at least a portion of the motion data and the video are transmitted. In such cases, the receiver of the video can generate or modify the video using received motion data.

FIG. 1 is a block diagram showing an example of the configuration of the video distribution system according to an embodiment. As shown in FIG. 1, the video distribution system 1 can include a plurality of terminal devices 10 connected to a communication line (not shown), and one or more server devices 20 connected to a communication line. Each terminal device 10 is connected to one or more server devices 20 via a communication line (not shown).

1-1. Terminal Device 10

The plurality of terminal devices 10 can include one or more distributor terminal devices 10 (here, a terminal device 10A) and one or more viewer terminal devices 10 of a viewer (here, a terminal device 10B to a terminal device 10D). Each terminal device 10 can have a common configuration and thus may include a terminal device (distributor terminal device 10) for distributing a video and/or a terminal device (viewer terminal device 10) for viewing a video.

When operating as a terminal device (distributor terminal device) for distributing a video, each terminal device 10 can execute an installed video distribution application. This allows each terminal device 10 to acquire motion data related to the motion of the distributor and transmit, to the server device 20 (distribution server system 20A) via a communication line, a first video including an animation of a virtual character (first avatar) changed according to the acquired data. For example, the motion data can be acquired using a motion capture system. As will be readily understood to one of ordinary skill in the art having the benefit of the present disclosure, examples of suitable motion capture systems that can be used with disclosed apparatus and methods include optical motion capture systems, including such systems using passive markers, active markers, or markerless systems and non-optical systems, including inertial and magnetic systems. Motion data can be captured with image capture devices (such as a CCD (charge-coupled device) or CMOS (complementary metal oxide semiconductor) image sensor) coupled to a computer that transforms the motion data into video or other image data. First video data generated using the motion capture system is distributed by the server device 20 (distribution server system 20A) via a communication line to a terminal device (viewer terminal device) 10 for receiving a video which executes an installed video viewing application. In this specification, the video distribution application installed in each terminal device 10 may be middleware or a combination of an application and middleware. Similarly, the video viewing application installed in each terminal device 10 may be middleware or a combination of an application and middleware.

When operating as a distributor terminal device, each terminal device 10 can execute a browser function incorporated in the installed video distribution application and/or execute an installed web browser application. This allows each terminal device 10 to receive a web page (for example, an HTML document, including in some examples, HTML documents encoding executable code such as JavaScript or PHP code) from the server device 20 (web server device 20B) and execute a computer-implemented game program included in this web page. By executing the game program, each terminal device 10 can generate a second video in which at least one game object is caused to act on the basis of operation data related to the operation of the distributor. This game object can include a game object including a virtual character (second avatar) of the distributor acting on the basis of the operation data.

When operating as a distributor terminal device, each terminal device 10 can transmit, by executing the video distribution application, the second video thus generated to the server device 20 (distribution server system 20A) via the communication line. Such the second video is also distributed by the server device 20 (distribution server system 20A) via a communication line to a terminal device (viewer terminal device) 10 for receiving a video which executes an installed video viewing application.

Furthermore, when operating as a distributor terminal device, each terminal device 10 can execute the video distribution application. This allows each terminal device 10 to receive via the communication line from the terminal device 10 of the viewer who views the second video (distributed by the distributor terminal device 10) via the server device 20 (distribution server system 20A), a token to the distributor and/or comment data indicative of transmitting a comment to the distributor. For example, the token can encode data indicative of a virtual token transmitted to the distributor.

On the other hand, when operating as a terminal device (viewer terminal device) for viewing a video, each terminal device 10 can execute an installed video viewing application. This allows each terminal device 10 to receive, via the server device 20 (distribution server system 20A), the first video and/or the second video distributed by the distributor terminal device 10.

Furthermore, when operating as a viewer terminal device, each terminal device 10 can execute the video viewing application. This allows each terminal device 10 to transmit tokens to the distributor and/or comment data indicative of transmitting a comment to the distributor to the distributor terminal device via the server device 20 (distribution server system).

Additionally, the above-described video distribution application and video viewing application can be installed and executed in each terminal device 10 as one integrated application or as separate applications.

Each terminal device 10 can be any terminal device capable of executing such an operation. For example, each terminal device 10 can include at least one of: a smartphone, a tablet, a mobile phone (feature phone), or a personal computer, without being limited thereto.

1-2. Server Device 20

FIG. 1 shows a distribution server system 20A and a web server device 20B as an example of one or more server devices 20.

The distribution server system 20A can distribute the first video and/or the second video transmitted by each terminal device (each distributor terminal device) 10 to each terminal device (each viewer terminal device) 10. Furthermore, the distribution server system 20A can transmit, to the terminal device 10 of a certain distributor, tokens and/or comment data to the distributor that have been transmitted by each terminal device (each viewer terminal device) 10.

In order to execute such operation, the distribution server system 20A, in one embodiment, can include a distribution server device 20a, a database (DB) server device 20b, and a game API server device 20c that are interconnected via a communication line (including a wireless line and/or a wired line that are not shown).

The distribution server device 20a can distribute, to each terminal device 10, the first video and/or the second video transmitted by the terminal device 10 of each distributor. Furthermore, the distribution server device 20a can store, into the DB server device 20b, token data and/or comment data transmitted by the terminal device 10 of each viewer.

The DB server device 20b can store token data or comment data received from the distribution server device 20a, read token data and/or comment data inquired by the game API server device 20c, and transmit them to the game API server device 20c.

When receiving an inquiry about token data and/or comment data from the terminal device 10 of each distributor, the game API server device 20c can read, from the DB server device 20b, token data and/or comment data for the terminal device 10 of the distributor, and transmit them to the terminal device 10 of the distributor.

The example shown in FIG. 1 outlines a configuration in which the distribution server system 20A has three server devices including the distribution server device 20a, the DB server device 20b, and the game API server device 20c for the purpose of balancing the load. However, at least one of the three server devices can be integrated with any of the remaining server devices.

Next, the web server device 20B can transmit, to the terminal device 10 of each distributor having accessed, a web page (document created according to HTML, for example, HTML5) in which a game program is incorporated. By being executed by the terminal device 10 having received and decoded this game program, the game program can cause the terminal device 10 to execute at least one of various operations related to distribution of a video as exemplified below:

Operation of executing the game;

Operation of transmitting, to the distribution server system 20A (distribution server device 20a), a game screen generated in accordance with execution of the game; and/or Operation of acquiring token data and/or comment data transmitted to this distributor from the distribution server system 20A (game API server device 20c).

1-3. Communication Line

The communication line (not shown) can include a mobile telephone network, a wireless network (e.g., RF connections via Bluetooth, WiFi (such as IEEE 802.11a/b/n), WiMax, cellular, satellite, laser, infrared), a fixed telephone network, the Internet, an intranet, a local area network (LAN), a wide-area network (WAN), and/or an Ethernet network, without being limited thereto. In a virtual host environment, the communication line(s) can be a virtualized network connection provided by the virtual host.

2. Hardware Configuration of Each Device

Next, an example of the hardware configuration of each of the terminal device 10 and the server device 20 will be described.

2-1. Hardware Configuration of Terminal Device 10

Figure 2:
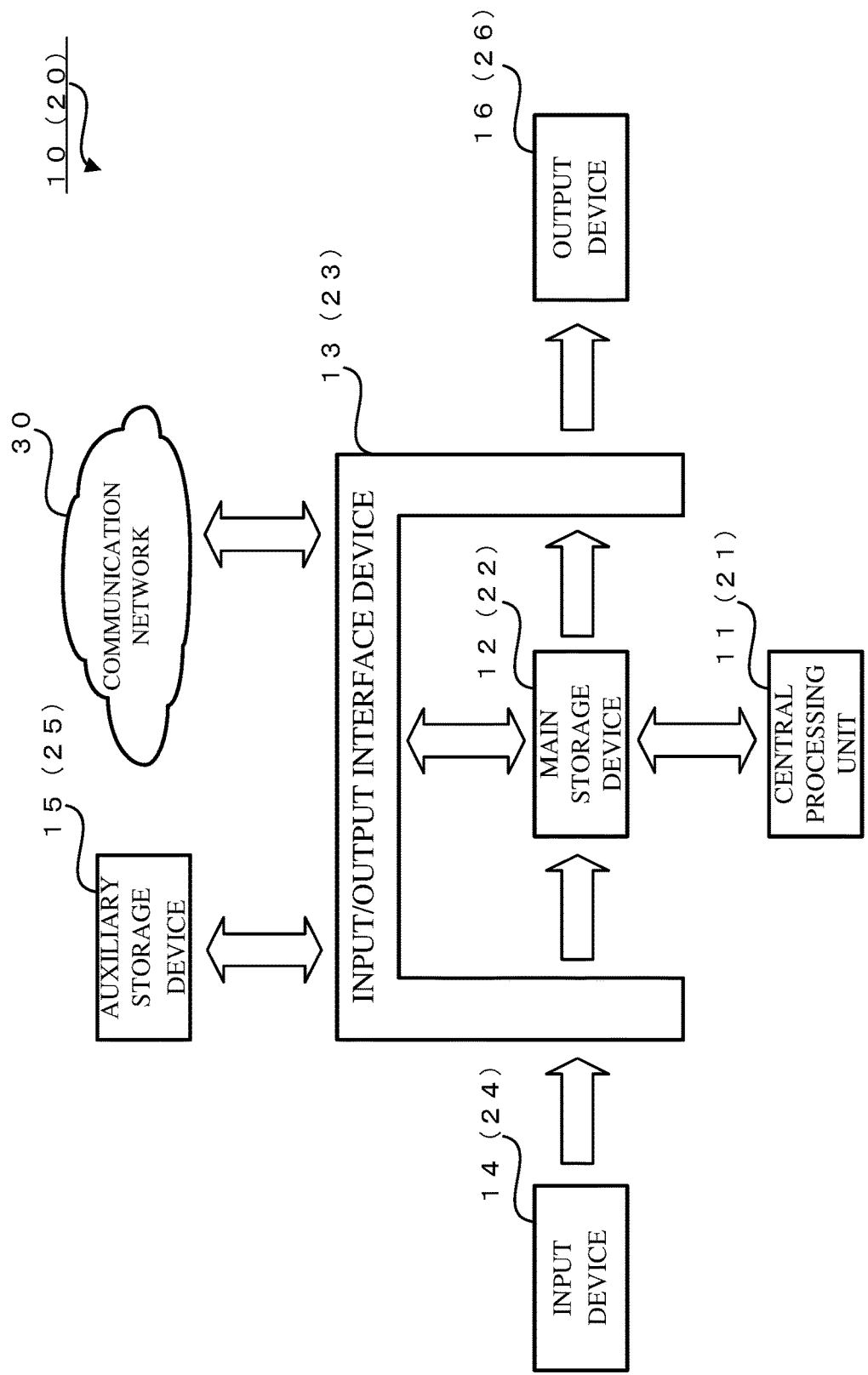
FIG. 2 is a block diagram schematically showing an example of a hardware configuration of a terminal device (server device) shown in FIG. 1.

An example of the hardware configuration of each terminal device 10 will be described with reference to FIG. 2. FIG. 2 is a block diagram schematically showing an example of the hardware configuration of the terminal device 10 (server device 20) shown in FIG. 1. (In FIG. 2, reference numerals in parentheses refer to the server device 20 as described later.)

As shown in FIG. 2, each terminal device 10 can mainly include a processor, for example, a central processing unit 11, a main storage device 12, an input/output interface device 13, an input device 14, an auxiliary storage device 15, and an output device 16. These devices are interconnected via a data bus and/or a control bus. The processor may be a real or virtual processor.

The central processing unit 11, which is referred to as a "CPU," can perform operations on instructions and data stored in the main storage device 12, and store the results of the operations in the main storage device 12. Furthermore, the central processing unit 11 can control and receive data from the input device 14, the auxiliary storage device 15, the output device 16, and the like via the input/output interface device 13. The terminal device 10 can include one or more such central processing units 11.

The main storage device 12, which is referred to as a "memory", can store instructions and data received from the input device 14, the auxiliary storage device 15, and a communication line 30 (server device 20 or the like) via the input/output interface device 13, as well as calculation results of the central processing unit 11. The main storage device 12 can include computer-readable media such as volatile memory (e.g., registers, cache, random access memory (RAM)), non-volatile memory (e.g., read-only memory (ROM), EEPROM, flash memory) and storage (e.g., a hard disk drive (HDD), solid-state drive (SSD), magnetic tape, optical media), without being limited thereto.

As should be readily understood, the term computer-readable storage media includes the media for data storage such as memory and storage, and not transmission media such as modulated data signals or transitory signals.

The auxiliary storage device 15 is a storage device typically having a capacity larger than that of the main storage device 12. It is possible to store instructions and data (computer programs) constituting the above-described specific applications (video distribution application, video viewing application, and the like), web browser applications, and the like. By being controlled by the central processing unit 11, the auxiliary storage device 15 can transmit these instructions and data (computer programs) to the main storage device 12 via the input/output interface device 13. The auxiliary storage device 15 can include a magnetic disk device and/or an optical disk device, without being limited thereto.

The input device 14 is a device that takes in data from the outside. The input device 14 includes a touch screen, a button, a keyboard, a mouse, and/or a sensor, without being limited thereto. As described later, the sensor can include a sensor including one or more cameras and/or one or more microphones, without being limited thereto. Sensor data can be provided to a motion capture system for use in generating video.

The output device 16 can include a display device, a touch screen, and/or a printer device, without being limited thereto.

In such a hardware configuration, the central processing unit 11 can load, into the main storage device 12, instructions and data (computer programs) constituting a specific application stored in the auxiliary storage device 15, and perform operations with the loaded instructions and data. This allows the central processing unit 11 to control the output device 16 via the input/output interface device 13, or to transmit and receive various data to and from other devices (e.g., the server device 20 and another terminal device 10) via the input/output interface device 13 and the communication line 30.

This allows the terminal device 10 to execute at least one of various operations described below (various operations described in detail later) by executing computer-executable instructions for the installed specific application:

Operation necessary for distributing the first video and/or the second video;

Operation necessary for receiving token data and/or comment data transmitted from another terminal device 10 to the own terminal device 10;

Operation necessary for receiving the first video and/or the second video distributed by another terminal device 10; or Operation necessary for transmitting token data and/or comment data to another terminal device 10, etc.

Additionally, the terminal device 10 can include one or more microprocessors and/or one or more graphics processing units (GPU) in place of or in addition to the central processing unit 11.

2-2. Hardware Configuration of Server Device 20

An example of the hardware configuration of each server device 20 is described with reference to FIG. 2 similarly. As the hardware configuration of each server device 20 (distribution server device 20a, DB server device 20b, game API server device 20c, and web server device 20B), the identical hardware configuration to that of each terminal device 10 described above can be used, for example. Therefore, reference numerals for the components of each server device 20 are shown in parentheses in FIG. 2.

As shown in FIG. 2, each server device 20 can mainly include a central processing unit 21, a main storage device 22, an input/output interface device 23, an input device 24, an auxiliary storage device 25, and an output device 26. These devices are interconnected via a data bus and/or a control bus.

The central processing unit 21, the main storage device 22, the input/output interface device 23, the input device 24, the auxiliary storage device 25, and the output device 26 may be substantially identical to the central processing unit 11, the main storage device 12, the input/output interface device 13, the input device 14, the auxiliary storage device 15, and the output device 16, respectively, included in each terminal device 10 described above.

In such a hardware configuration, the central processing unit 21 can sequentially load, into the main storage device 22, instructions and data (computer programs) constituting a specific application stored in the auxiliary storage device 25, and calculate the loaded instructions and data. This allows the central processing unit 21 to control the output device 26 via the input/output interface device 23, or to transmit and receive various data to and from other devices (e.g., each terminal device 10) via the input/output interface device 23 and the communication line 30.

This allows the server device 20 to execute an operation necessary for distributing, to the terminal device 10 of each viewer, the first video and/or the second video transmitted by the terminal device 10 of each distributor, an operation necessary for transmitting, to the terminal device 10 of a certain distributor, token data and/or comment data transmitted by the terminal device 10 of each viewer to the terminal device 10 of the distributor, and the like (including various operations described in detail later).

Additionally, the server device 20 can include one or more microprocessors and/or one or more graphics processing units (GPU) in place of or in addition to the central processing unit 21.

3. Functions of Each Device

Next, an example of functions of each of the terminal device 10 and the server device 20 will be described.

3-1. Functions of Terminal Device 10

Figure 3:
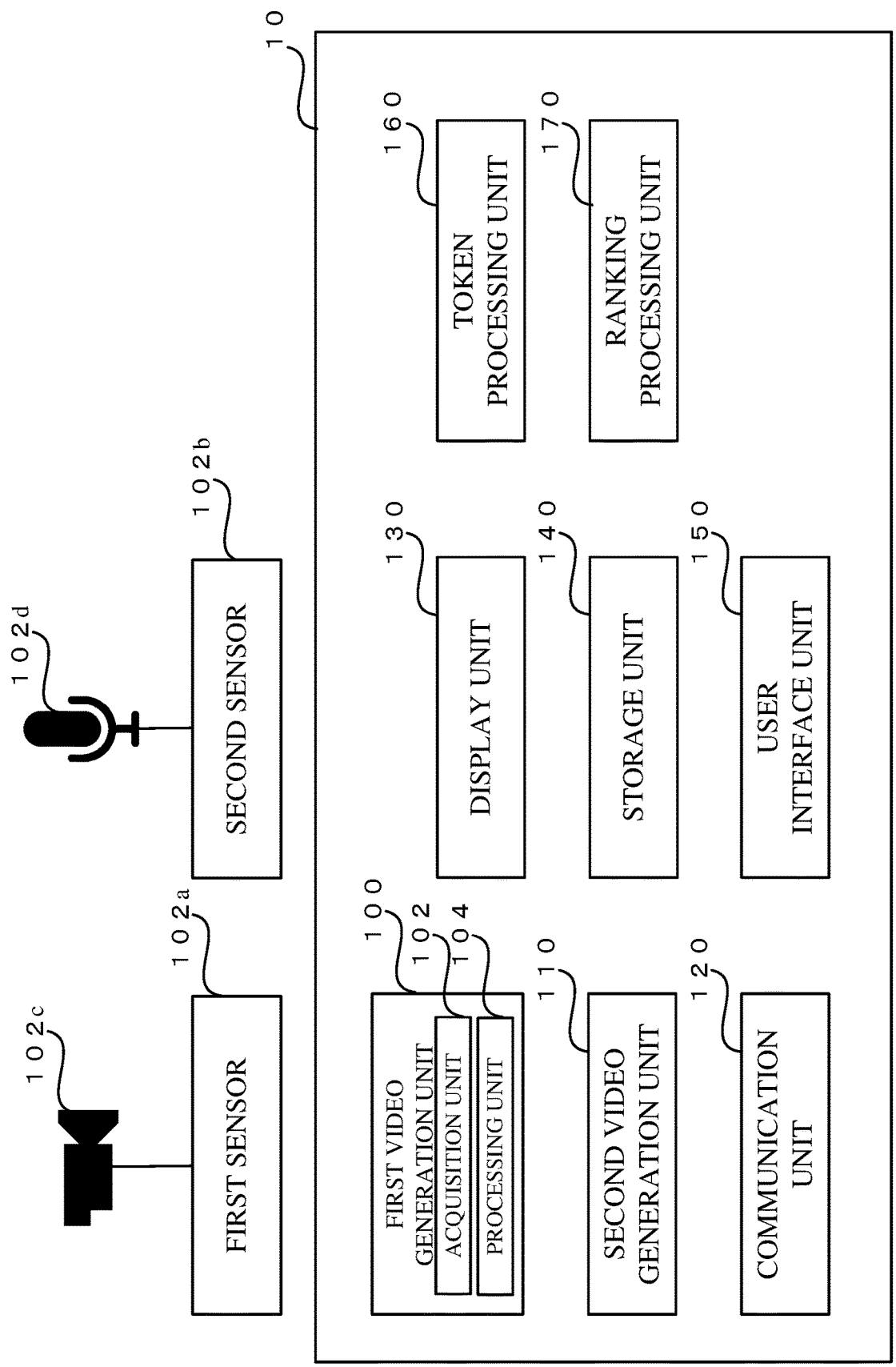
FIG. 3 is a block diagram schematically showing an example of a function of the terminal device shown in FIG. 1.

An example of the function of the terminal device 10 will be described with reference to FIG. 3. FIG. 3 is a block diagram schematically showing an example of a function of the terminal device 10 shown in FIG. 1.

As shown in FIG. 3, the terminal device 10 can mainly include a first video generation unit 100, a second video generation unit 110, a communication unit 120, a display unit 130, a storage unit 140, a user interface unit 150, and a token processing unit 160.

(1) First Video Generation Unit 100

The first video generation unit 100 can generate the first video including an animation of a first avatar of a distributor on the basis of motion data related to the motion of the distributor. In order to realize this, the first video generation unit 100 can include an acquisition unit 102 and a processing unit 104, for example.

The acquisition unit 102 can include one or more first sensors 102a that acquire data related to the face of the distributor, and one or more second sensors 102b that acquire voice data related to speech and/or vocal given by the distributor.

In a preferred embodiment, the first sensor 102a can include an RGB camera 102c that captures visible light and a near infrared camera that captures near infrared rays. As such a camera, it is possible to use a camera included in a True Depth camera of iPhone X, for example. The second sensor 102b can include a microphone 102d to record voice and other audio.

First, regarding the first sensor 102a, the acquisition unit 102 captures an image of the face of the distributor using the first sensor 102a arranged close to the face of the distributor. This allows the acquisition unit 102 to generate data in which an image acquired by the RGB camera is recorded over a unit time in association with a time code (code indicative of the time of acquisition). The data described above can be an MPEG file, for example.

Furthermore, the acquisition unit 102 can generate data in which a predetermined number (e.g., 51) of numerical values (e.g., floating-point numerical values) indicative of the depth acquired by the near infrared camera are recorded over a unit time in association with the time code. The data described above can be, for example, a TSV file, which is a file in which a plurality of data are recorded by separating the data with tabs.

Regarding the near infrared camera, more specifically, a dot projector emits an infrared laser including a dot (point) pattern to the face of the performer, and the near infrared camera captures infrared dots projected and reflected on the face of the performer, thereby generating an image of the infrared dots captured in this manner. The acquisition unit 102 can compare an image of the dot pattern emitted by the dot projector registered in advance with an image captured by the near infrared camera. This allows the acquisition unit 102 to calculate the depth of each point (each feature point) by using positional deviation at each point (each feature point) in both images. Here, the points can include 51 points, for example. The depth of each point indicates the distance between each point and the near infrared camera. The acquisition unit 102 can generate data in which a numerical value indicative of the thus calculated depth is recorded over a unit time in association with the time code as described above.

Next, regarding the second sensor 102b, the acquisition unit 102 acquires the voice related to the speech and/or vocal given by the distributor using the second sensor 102b arranged close to the distributor. This allows the acquisition unit 102 to generate data recorded over a unit time in association with the time code. The data described above can be an MPEG file, for example. In an embodiment, the acquisition unit 102 can acquire data related to the face of the distributor using the first sensor 102a, and at the same time, acquire voice data related to speech and/or vocal given by the distributor using the second sensor 102b. In this case, the acquisition unit 102 can generate data (e.g., MPEG file) in which an image acquired by the RGB camera and voice data related to speech and/or vocal given by the distributor using the second sensor 102b are recorded over a unit time in association with an identical time code.

The acquisition unit 102 can output, to the processing unit 104, the thus generated data (MPEG file, TSV file, and the like) related to the face of the distributor and/or the voice data (MPEG file and the like) related to the speech and/or vocal given by the distributor.

Here, the case where the first sensor 102a includes an RGB camera and an infrared camera has been described. However, the first sensor 102a can include any of the following (A) to (C), for example.

(A) A camera that detects infrared rays emitted by an infrared laser and reflected on the face of the performer;
(B) A plurality of RGB cameras that capture visible light; or
(C) A single camera that captures visible light.

In the case of (A), the acquisition unit 102 can calculate the depth of each feature point on the face of the distributor by the same technique as that described above. In the case of (B), the acquisition unit 102 can calculate the depth of each feature point on the face of the distributor using a plurality of images captured by the plurality of RGB cameras. In the case of (C), the acquisition unit 102 can calculate, by using deep learning or the like, the depth of each feature point on the face of the distributor from the image captured by the single camera. Furthermore, in the case of (C), the acquisition unit 102 can calculate the depth of each feature point on the face of the performer by analysis processing (image processing and the like) for the image captured by the single camera.

On the basis of the data related to the face of the distributor from the acquisition unit 102, the processing unit 104 can generate a video including an animation of a virtual character (first avatar of the distributor). Regarding the video itself of a virtual character, the processing unit 104 can generate the video of the virtual character by causing a rendering unit (not shown) to execute rendering using various data stored in a character data storage unit (not shown). The various data described above can include, for example, geometry data, bone data, texture data, shader data, and blend shape data.

Furthermore, the processing unit 104 can generate, by using various well-known technologies, a video in which the facial expression of the first avatar is changed by using the data related to the face of the distributor from the acquisition unit 102 (data related to the depth of each feature point on the face of the performer). The video described above can be, for example, a video in which the facial expression of the first avatar is changed in synchronization with the movement of the mouth and both eyes of the performer, e.g., a video in which the facial expression of the first avatar is changed by lip sync and gaze tracking of the face of the performer.

Additionally, any other suitable technology can be used in order to generate the first video including an animation of the first avatar of the distributor on the basis of motion data related to the action of the distributor. An example of such technology includes a technique referred to as "blend shapes" described in a website identified by the following URL.

https://developer.apple.com/documentation/arkit/arface-anchor/2928251-blendshapes When this technology is used, the processing unit 104 can adjust parameters of one or more feature points corresponding to the action of the distributor among a plurality of feature points on the upper body (face and so on) of the distributor. This allows the processing unit 104 to generate a video of a virtual character that follows the action of the distributor.

(2) Second Video Generation Unit 110

The second video generation unit 110 can generate the second video related to the computer-implemented game on the basis of operation data related to the operation of the distributor by using the web page received from the web server device 20B.

Specifically, the second video generation unit 110 can execute a game program incorporated in the web page received from the web server device 20B. This allows the second video generation unit 110 to draw the second video (game video) related to the game in which the game object (own game object) including the second avatar of the distributor acts, on the basis of the operation data indicative of the operation of the distributor having been input by the user interface unit 150. For example, the operation data can include one or more of the following: data indicative of how the distributor has swiped a touch pad display, data indicative of which object the distributer has tapped or clicked, or data indicative of how the distributor has dragged a touch pad display, or other such operation data. In the second video, for example, various game objects including an enemy character attacking the own game object and a wingman character supporting the own game object act according to the game program.

(3) Communication Unit 120

The communication unit 120 can communicate various data required for distribution and/or viewing of a video between the distribution server system 20A and the web server device 20B. For example, the communication unit 120 can access the web server device 20B and receive a web page (HTML document) including a game program required for execution of the game. When the terminal device 10 operates as the terminal device of the distributor, the communication unit 120 can transmit the first video and/or the second video to the distribution server system 20A, and receive, from the distribution server system 20A, token data and/or comment data transmitted to the distributor. Furthermore, when the terminal device 10 operates as the terminal device of the viewer, the communication unit 120 can receive, from the distribution server system 20A, the first video and/or the second video transmitted by the terminal device 10 of the distributor, and transmit token data and/or comment data for the distributor to the distribution server system 20A.

(4) Display Unit 130

The display unit 130 can display various images for distribution and/or viewing of the video. For example, the display unit 130 can display the first video and/or the second video to be distributed and/or the first video and/or the second video having been received.

(5) Storage Unit 140

The storage unit 140 can store various data used for distribution and/or viewing of the video.

(6) User Interface Unit 150

The user interface unit 150 can input various data required for distribution and/or viewing of the video through a user manipulation. For example, when the computer-implemented game is executed, the user interface unit 150 can input operation data indicative of the contents of the manipulation of the distributor from the distributor and output the operation data to the second video generation unit 110.

(7) Token Processing Unit 160

The token processing unit 160 can process token data transmitted and received in relation to distribution and/or viewing of the video. For example, when the terminal device 10 operates as the terminal device of the distributor, the token processing unit 160 can process the token data transmitted to the distributor. When the terminal device 10 operates as the terminal device of the viewer, the token processing unit 160 can process the token data transmitted by the viewer.

3-2. Functions of Server Device 20

Figure 4:
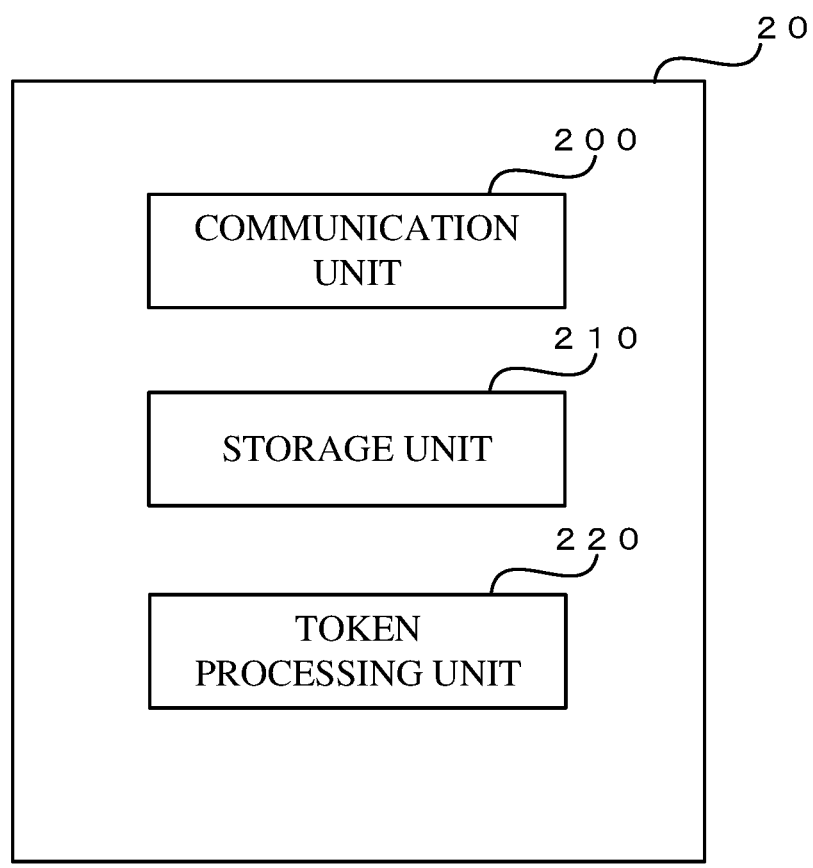
FIG. 4 is a block diagram schematically showing an example of a function of the server device shown in FIG. 1.

An example of the function of the server device 20 will be described with reference to FIG. 4. FIG. 4 is a block diagram schematically showing an example of a function of the server device 20 shown in FIG. 1.

As shown in FIG. 4, the server device 20 can mainly include a communication unit 200, a storage unit 210, and a token processing unit 220.

The communication unit 200 can communicate various data used for distribution and/or viewing of a video between the terminal device 10 of the distributor and/or the terminal device 10 of the viewer. For example, when operating as the distribution server system 20A, the server device 20 can receive the first video and/or the second video from the terminal device 10 of each distributor and distribute the first video and/or the second video to the terminal device 10 of each viewer. When operating as the web server device 20B, the server device 20 can transmit, to the terminal device 10 of each distributor having accessed, a web page in which a computer-implemented game program is incorporated.

The storage unit 210 can store various data used for distribution and/or viewing of the video.

The token processing unit 220 can process the token data transmitted from each viewer to each distributor.

Additionally, when the server device 20 operates as the web server device 20B, the token processing unit 220 may be omitted.

4. Overall Operation of Video Distribution System 1

Figure 5A:
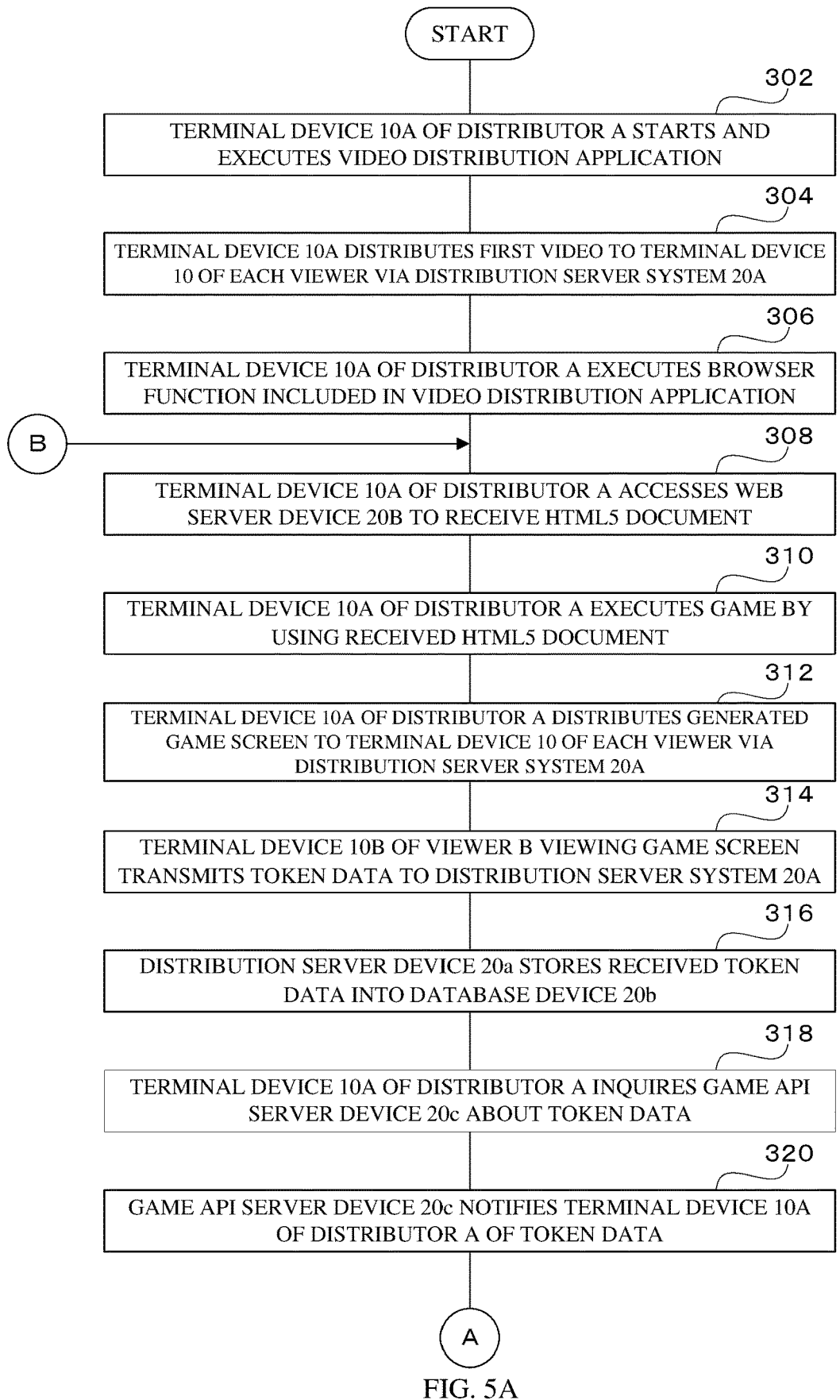
FIG. 5A is a flow diagram showing an example of an operation performed in the video delivery system shown in FIG. 1.
Figure 5B:
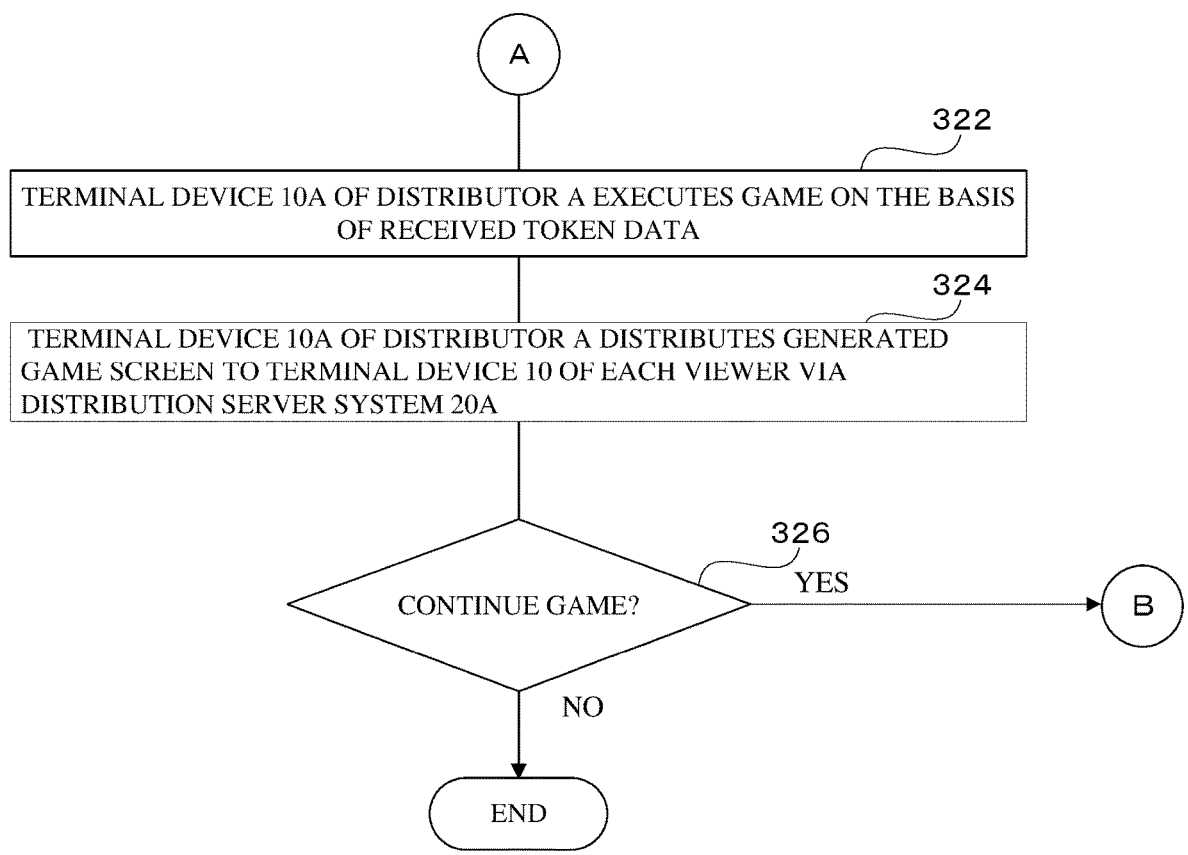
FIG. 5B is a flow diagram showing an example of an operation performed in the video delivery system shown in FIG. 1.

Next, the overall operation performed in the video distribution system 1 having the above configuration will be described with reference to FIGS. 5A and 5B. FIGS. 5A and 5B are flow diagrams showing an example of the operation performed in the video distribution system 1 shown in FIG. 1.

First, referring to FIG. 5A, in step (hereinafter referred to as "ST") 302, his/her terminal device 10 (here, terminal device 10A) starts and executes the video distribution application, following the operation of the distributor (here, distributor A).

Figure 6:
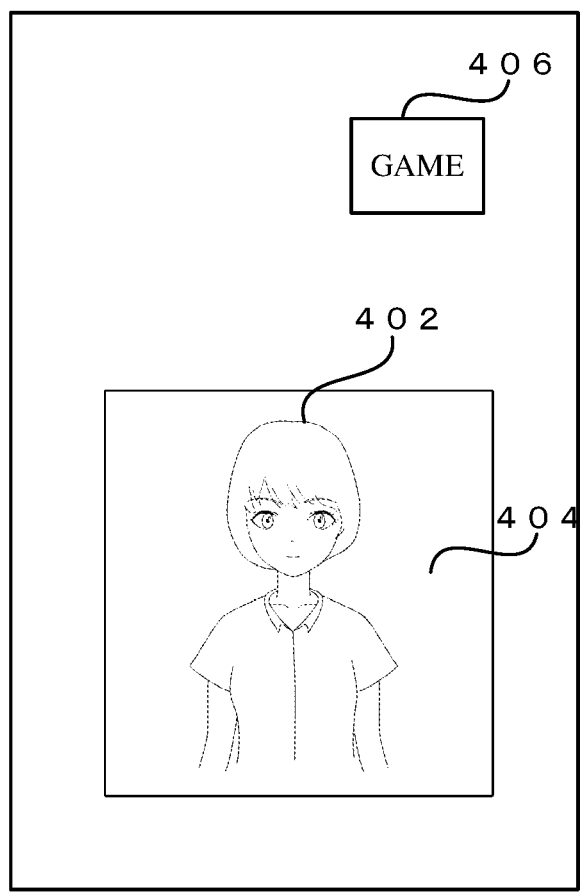
FIG. 6 is a schematic view showing an example of a first video displayed on a display unit of the terminal device shown in FIG. 1.

Next, in ST304, the terminal device 10A generates the first video including the animation of the first avatar of the distributor A on the basis of the motion data related to the motion of the distributor A. Due to this, as illustrated in FIG. 6, the display unit 130 of the terminal device 10A displays a first video 404 including the animation of a first avatar 402 of the distributor A.

Returning to FIG. 5A, the terminal device 10A transmits the generated first video 404 to the distribution server device 20a of the distribution server system 20A. The distribution server device 20a distributes the first video received from the terminal device 10A to the terminal device 10 of each viewer executing the video viewing application. Due to this, the display unit 130 of the terminal device 10 of each viewer also displays the first video 404 as illustrated in FIG. 6.

Next, in ST306, when the distributor A taps an icon 406 called "Game" (see FIG. 6) displayed on the display unit 130 of the terminal device 10A, the terminal device 10A executes a browser function implemented in the video distribution application. Due to this, in ST308, the terminal device 10A can receive an HTML5 document in which the game program is incorporated, by accessing the web server device 20B in a state where the video distribution application is executed (e.g., the first video 404 is distributed toward the terminal device 10 of each viewer).

Next, in ST310, the terminal device 10A can generate a video (second video) related to the game by executing the game program incorporated in the received HTML5 document.

Figure 7:
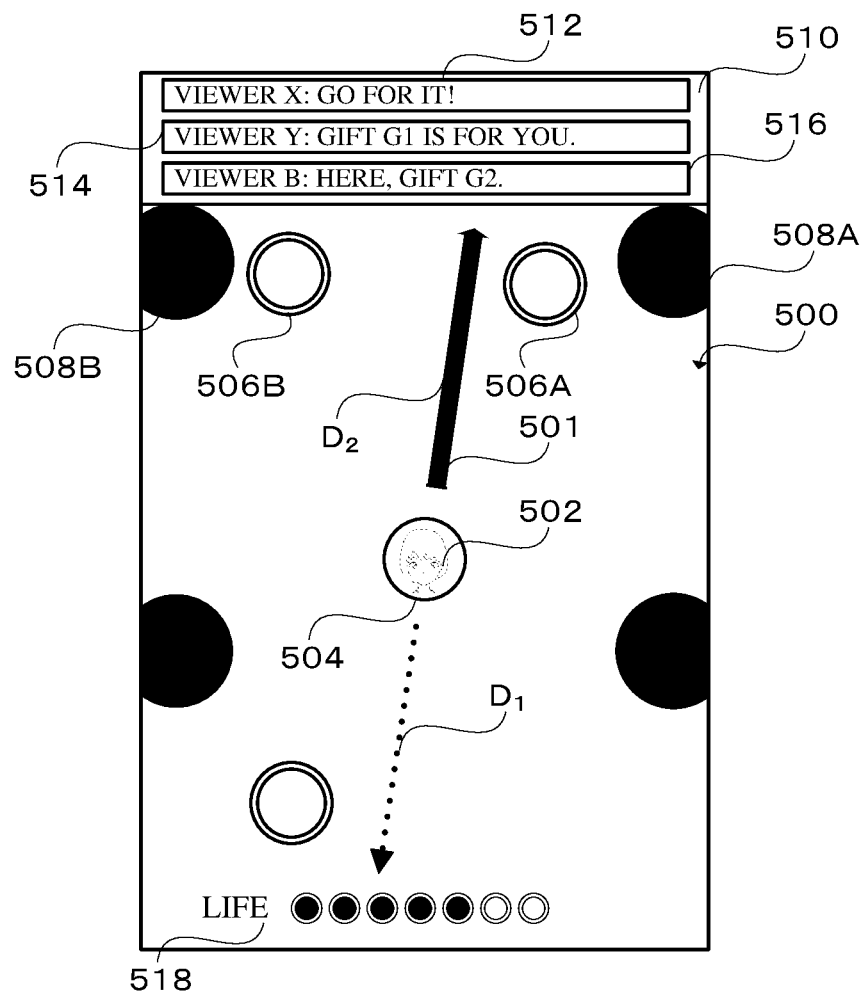
FIG. 7 is a schematic view showing an example of a second video displayed on the display unit of the terminal device when a first unit section of the game is being executed by the terminal device shown in FIG. 1.

FIG. 7 is a schematic view showing an example of the second video displayed on the display unit of the terminal device 10A shown in FIG. 1. As illustrated in FIG. 7, in a second video 500, an own game object 504 including a second avatar 502 of the distributor A can act on the basis of operation data related to the operation performed for the user interface unit 150 of the distributor A. This allows the own game object 504, for example, to act according to the operation of the distributor A and striking with a ball as a game object 506A to drop the game object 506A into a pocket 508A.

The second avatar 502 of the distributor A can be generated using the first avatar 402 of the first distributor A. For example, the second avatar 502 may be completely or substantially identical to the first avatar 402, may be a modification, reduction, and/or enlargement of at least a part of the first avatar 402, or may be a part of the first avatar 402.

In the second video 500, comment data transmitted from at least one viewer to the distributor A may be displayed on a part of area (chat area) (for example, in an upper area 510 as illustrated in FIG. 7). The comment data can include optional comment data such as a comment 512 indicating that a viewer X supports the distributor A and a comment 514 indicating that a viewer Y has given a token G1 to the distributor A.

Returning to FIG. 5A, in ST312, the terminal device 10A transmits the second video (game screen) 500 generated in ST310 to the distribution server device 20a of the distribution server system 20A (note that while the second video 500 is being transmitted to the distribution server device 20a of the distribution server system 20A, the terminal device 10A may stop transmitting the first video 404 or may transmit the first video 404). The distribution server device 20a distributes the second video received from the terminal device 10A to the terminal device 10 of each viewer executing the video viewing application (note that when receiving not only the second video 500 but also the first video 404 from the terminal device 10A, the distribution server device 20a may transmit only the second video 500 or both the second video 500 and the first video 404 to the terminal device 10 of each viewer). This also allows the display unit 130 of the terminal device 10 of each viewer to display the second video 500 as illustrated in FIG. 7 (for example, in a state of covering the first video 404 as illustrated in FIG. 6 with most of the first video 404 hidden).

Next, in ST314, a case where a viewer (viewer B) viewing the second video 500 transmitted by the terminal device 10A gives a token G2 to the distributor A will be considered. The viewer B can operate his/her terminal device 10B to select a token B from a plurality of prepared tokens and select a command to be given to the distributor A. Thus, the terminal device 10B transmits, to the distribution server device 20a of the distribution server system 20A, token data indicative of providing the token G2 to the distributor A. The token data can include, for example, receiver identification data to identify a receiver of the token (distributor A), token identification data to identify the token, and transmitter identification data to identify a transmitter of the token (viewer B).

When providing a token by operating his/her terminal device 10B, the viewer B can also transmit a comment together with the token. In this case, the token data transmitted by the terminal device 10B to the distribution server device 20a can include comment data in addition to the receiver identification data, the token identification data, and the transmitter identification data.

In ST316, the distribution server device 20a can store the token data received from the terminal device 10B in the DB server device 20b. For example, the DB server device 20b can store, as token data, piece count identification data, which is to identify as to what number the token was given, the token identification data, and the transmitter identification data (moreover, comment data), in association with the receiver identification data.

In ST318, the terminal device 10A of the distributor A can make an inquiry to the game API server device 20c whether new token data has arrived to the distributor A at each predetermined cycle (time interval) while the game is being executed. For example, when having received one piece of token data (e.g., token data from the viewer Y illustrated in FIG. 7) from the game API server device 20c since the start of playing the game, the terminal device 10A can make an inquiry to the game API server device 20c as to whether or not the second and subsequent pieces of token data are present.

In ST320, in response to an inquiry from the terminal device 10A, the game API server device 20c requests the DB server device 20b for the second and subsequent pieces of token data about the distributor A. When having successfully retrieved the second and subsequent pieces of piece count identification data as the piece count identification data stored in association with the distributor A (receiver identification data), the DB server device 20b transmits the token identification data and the transmitter identification data (moreover, the comment data) corresponding to each of the second and subsequent pieces of piece count identification data to the game API server device 20c as the second piece of token data. Here, on the assumption of having successfully retrieved only the second piece of the piece count identification data, the DB server device 20b transmits the token identification data and the transmitter identification data (moreover, the comment data) corresponding to the second piece of piece count identification data to the game API server device 20c as the second piece of token data. In response to this, the game API server device 20c transmits the second piece of token data to the terminal device 10A of the distributor A.

Figure 9:
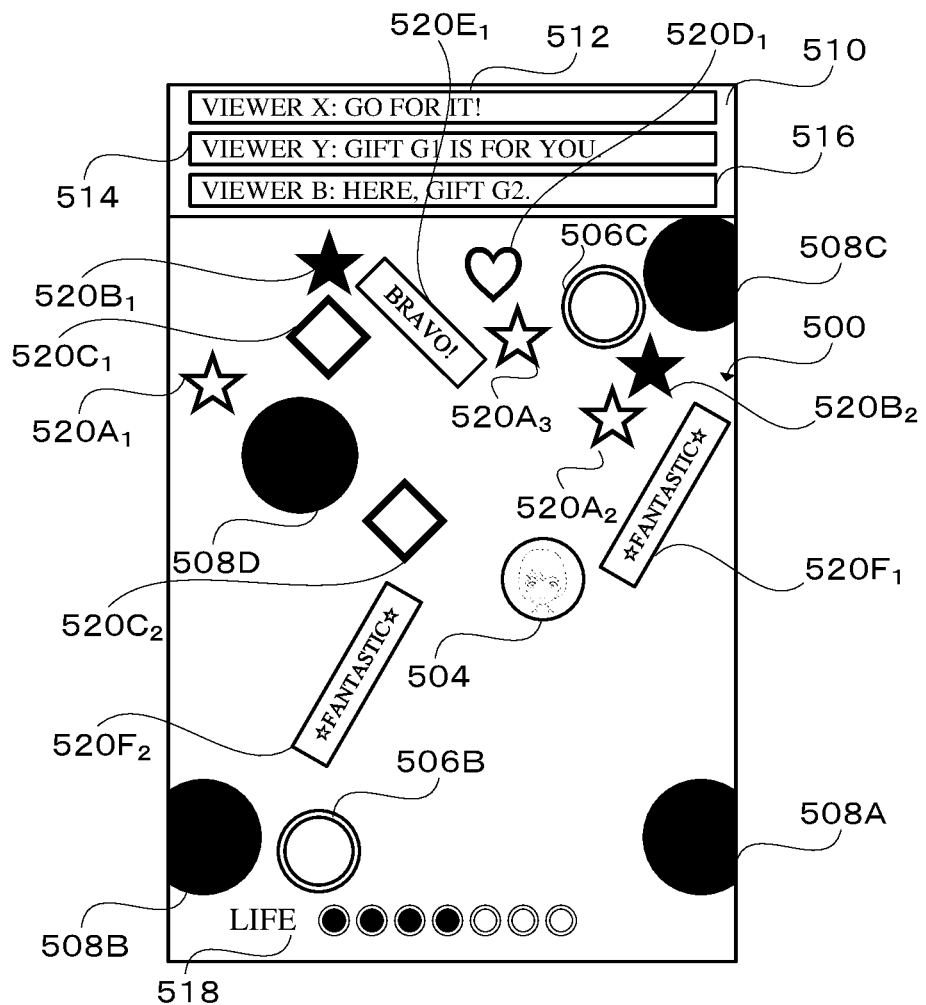
FIG. 9 is a schematic view showing an example of the second video displayed on the display unit of the terminal device when a first time section of the game is being executed by the terminal device shown in FIG. 1.

Next, referring to FIG. 5B, in ST322, the terminal device 10A having received the second piece of token data can execute the game on the basis of the second piece of token data. The terminal device 10A can display, on the game screen (second video), a game object having been set on the basis of the transmitter (here, viewer B) identified by the transmitter identification data included in the token data and/or a token (here, token G2) uniquely identified by the token identification data included in the token data. For example, the terminal device 10A can display, on the second video, a game object corresponding to the token G2 (for example, either one of the game objects 520A to 520F), as shown in FIG. 9. The terminal device 10A can also display, on the second video, a game object (enemy character and/or friend character) including the avatar of the viewer B, or can display, on the second video, an own game object (game object including the second avatar of the distributor A) whose hit point has increased on the basis of the token G2, although this is not shown in FIG. 9. Each terminal device 10 can store the avatar (image) of the user (viewer) in association with each piece of transmitter identification data, and can store the token (image) or the like in association with each piece of token identification data. This allows each terminal device 10 to generate and display the second video including the avatar of each viewer and/or each token. A specific technique of generating the second video on the basis of the token data will be described later in Section 5.

The terminal device 10A can also display the comment data included in the token data on the game screen (second video). For example, as illustrated in FIG. 7, when the viewer B selects in ST314 transmitting a comment when providing the token G2 to the distributor A, the terminal device 10A can display the comment data 516 of "Here, token G2." on the second video 500. In this way, the viewer's comment displayed on the second video 500 can correspond to the token data transmitted from the viewer to the distributor.

The terminal device 10A has received two pieces of token data from the game API server device 20c so far (the terminal device 10A identifies how many pieces of token data have been received so far during the execution of the game), and hence the terminal device 10A can make an inquiry to the game API server device 20c as to whether or not the third and subsequent pieces of token data are present in the next cycle (time interval).

Next, returning to FIG. 5B, the terminal device 10A distributes in ST324 the second video 500 including the game object having been set on the basis of the token data in this manner to the terminal device 10 of each viewer via the distribution server system 20A in the same technique as in ST312.

Next, in ST326, in the case of continuing the game, the terminal device 10A can repeat the processing in and after ST308 described above. On the other hand, when the terminal device 10A does not continue the game, the process ends.

5. Generation of Second Video (Game Screen) Based on Token Data

Next, a specific example of a technique for generating the second video on the basis of the token data mentioned in relation to ST308 to ST324 described above will be described.

5-1. First Example

Figure 8:
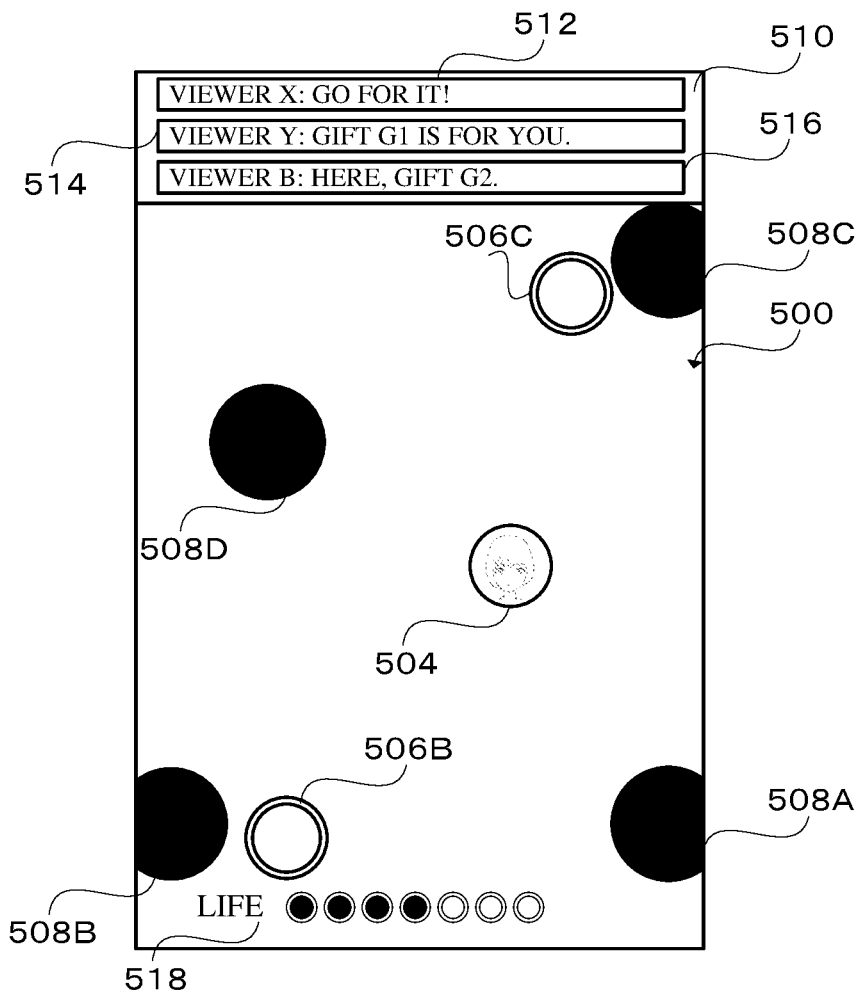
FIG. 8 is a schematic view showing an example of the second video displayed on the display unit of the terminal device at the time point when the first unit section of the game is ended by the terminal device shown in FIG. 1.
Figure 10:
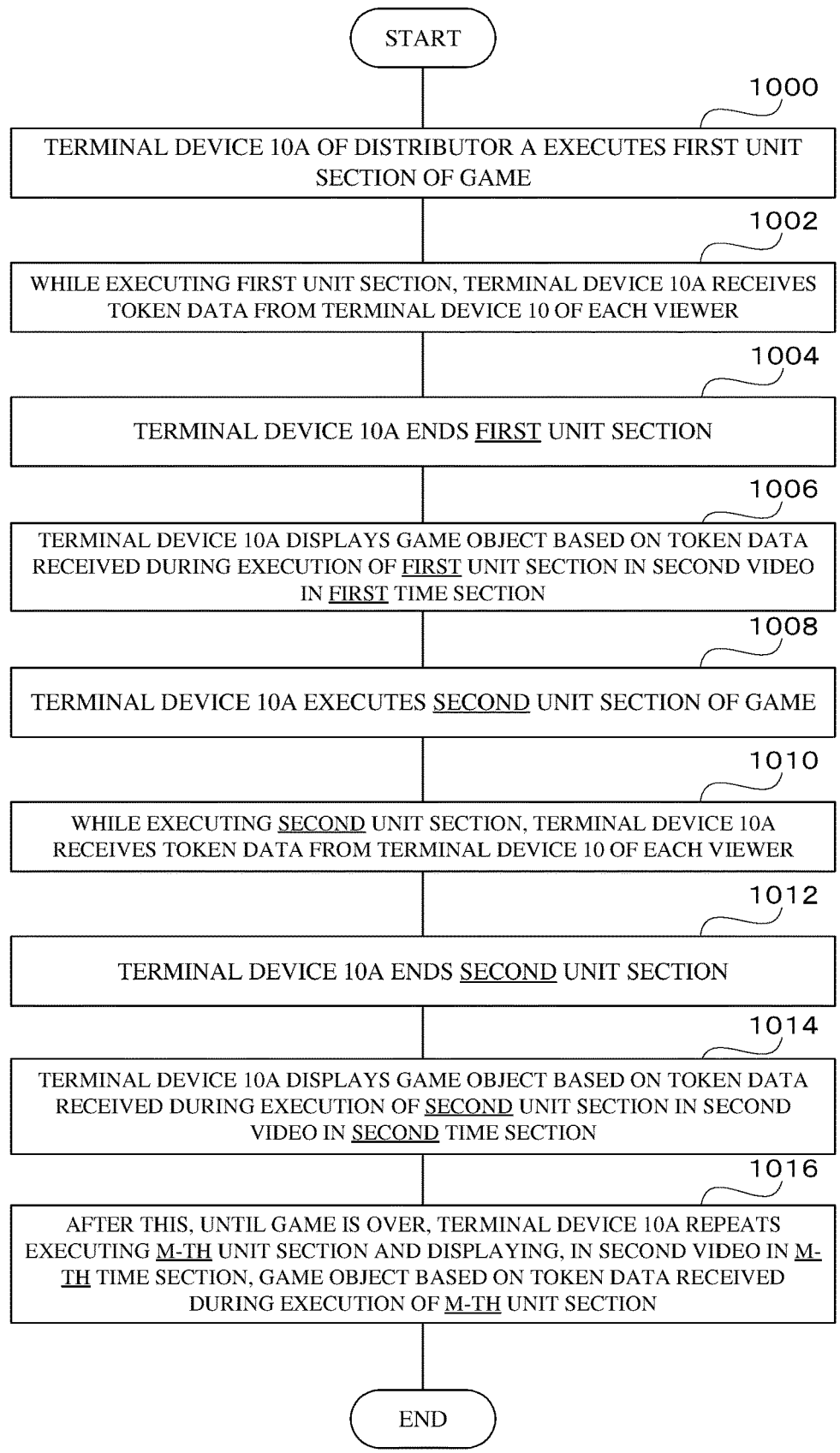
FIG. 10 is a flow diagram showing a specific example of an operation performed in the video distribution system shown in FIG. 1.

FIG. 7 is a schematic view showing an example of the second video displayed on the display unit of the terminal device 10A when the first unit section of the game is being executed by the terminal device 10A shown in FIG. 1. FIG. 8 is a schematic view showing an example of the second video displayed on the display unit of the terminal device 10A at the time point when the first unit section of the game is ended by the terminal device 10A shown in FIG. 1. FIG. 9 is a schematic view showing an example of the second video displayed on the display unit of the terminal device 10A when the first time section of the game is being executed by the terminal device 10A shown in FIG. 1. FIG. 10 is a flow diagram showing a specific example of the operation performed in the video distribution system 1 shown in FIG. 1.

The unit section is a collection of activities in the game. For example, the unit section can include at least one action, at least one scene, at least one scenario, at least one stage, at least one area, at least one round, at least one phase, at least one level/map/act/world, at least one game, and a combination of these.

A time section is a period of time in the game, which can occur between a unit section and a next unit section. For example, the time section can be a fixed period of time during which an activity is to be completed.

In the game described here, as illustrated in FIG. 7, the distributor A moves upward the own game object 504 including the second avatar 502, thereby striking the own game object 504 with a ball (a ball 506A and a ball 506B are illustrated as examples in FIG. 7), which is one of the game objects, and dropping the ball into a pocket (a pocket 508A and a pocket 508B are illustrated as examples in FIG. 7), which is one of the game objects.

Each time the distributor A moves the own game object 504 once, the hit point (physical strength) indicated in a gauge 518 labeled "Life" decreases by one. This hit point also corresponds to the number of times (number of operations and number of moves) in which the distributor A can operate or move the own game object 504. When the hit point indicated in the gauge 518 becomes 0, the game is over. Such a hit point increases by one when the distributor A successfully drops one ball (506A or 506B) into the pocket (508A or 508B).

The game is also over when the own game object 504 drops into the pocket (508A or 508B).

First, in ST1000 shown in FIG. 10, the terminal device 10A of the distributor A executes the first unit section of the game. Additionally, the execution of the first unit section may be started when the distributor A executes at least one operation (e.g., an operation of clicking the start button and/or an operation of touching the own game object 504) via the user interface unit 150. When the first unit section is executed, the distributor A can move the own game object 504 of the distributor A only once, for example, via the user interface unit 150 of the terminal device 10A. Specifically, for example, the distributor A can adjust a direction $D_2$ of the force acting on the own game object 504, by shifting his/her finger in a desired direction $D_1$ with the finger being put on the own game object 504 on an unillustrated touch screen (swipe operation) (The direction $D_2$ of the force is expressed by the direction in which an arrow 501 is oriented. Additionally, the direction $D_1$ and the direction $D_2$ have a relationship of being different from each other by 180 degrees.). In this state, the further the distributor moves his/her finger downward (or upward), the more he/she can increase (or decrease) the magnitude of the force acting on the own game object 504 (the magnitude of the force is expressed by the length of the arrow 501).

When the distributor A releases his/her finger from the touch screen, the own game object 504 is applied with a force having the magnitude indicated by the arrow 501, and moves in the direction indicated by the arrow 501.

As a result, the own game object 504 can collide with the ball 506A to drop the ball into the pocket 508A, and rolls to an area between the pocket 508A and the pocket 508B and a new pocket 508D as illustrated in FIG. 8. Since the own game object 504 moves from the position illustrated in FIG. 7 to the position illustrated in FIG. 8, the second video 500 can be expressed so that the entire screen scrolls downward. In the example shown in FIG. 8, the second video 500 can be scrolled so that the own game object 504 is always displayed substantially in the center in the vertical direction.

Returning to FIG. 10, in ST1002, in parallel with such operation of the distributor A, e.g., in parallel with execution of the first unit section by the terminal device 10A, the terminal device 10A can receive, via the distribution server system 20A, token data (by the method described above with reference to FIGS. 5A and 5B) from the terminal device 10 of each viewer viewing the second video 500. However, the game object based on such token data is not displayed in the second video 500 (except for a comment 516 illustrated in FIG. 7) while the first unit section is being executed.

Next, the own game object 504 can move to the position illustrated in FIG. 8 and stop at the position, when the distributor A executes a series of operations (at least one operation) including an operation of bringing his/her finger into contact with the touch screen, an operation of moving downward the finger thus brought into contact with the touch screen (including an operation of moving the finger in any direction in order to adjust the force acting on the own game object 504 and its direction), and an operation of releasing the finger from the touch screen. Thus, at the time point when the own game object 504 stops at the position illustrated in FIG. 8, the terminal device 10A ends the execution of the first unit section in ST1004 shown in FIG. 10.

Next, in ST1006, the terminal device 10A can display the game object based on the token data received during the execution of the first unit section in the second video 500 in the first time section occurring after the first unit section. Specifically, as illustrated in, for example, FIG. 9, six types of token objects 520A, 520B, 520C, 520D, 520E, and 520F, for example, can be displayed in the second video 500 in the first time section.

In the example shown in FIG. 9, as the first type of token object 520A, three token objects 520A1, 520A2, and 520A3 having a shape resembling an outlined star are displayed. As the second type of token object 520B, two token objects 520B1 and 520B2 having a shape resembling a blackened star are displayed. As the third type of token object 520C, two token objects 520C1 and 520C2 having a shape resembling an outlined diamond are displayed. As the fourth type of token object 520D, one token object $520D_1$ having a shape resembling an outlined heart is displayed. As the fifth type of token object 520E, one token object 520E1 having a text "Bravo!" is displayed. As the sixth type of token object 520F, two token objects $520F_1$ and $520F_2$ having a text "☆Fantastic☆" are displayed. Additionally, seven or more types of token objects 520 may be displayed.

Such token objects can be displayed in an area between a plurality of important game objects so that the token object does not overlap the plurality of game objects important for the progress of the game displayed in the second video 500. The plurality of important game objects includes the ball 506, the pocket 508, and the own game object 504 illustrated in FIG. 9. The important game object is a game object that may hinder the progress of the game if displayed over any of the token objects. For example, if the ball 506, the pocket 508, and the own game object 504 are hidden by any of the token objects, the distributor A becomes incapable of recognizing where these game objects are displayed in the second video 500, and hence he/she can become difficult to smoothly play the game. Thus, as illustrated in FIG. 9, since in the technology disclosed in the present application, the token object is displayed in an area between the plurality of important game objects, the plurality of important game objects is clearly displayed without being hidden by the token object. Hence, the distributor A can play the game without being hindered from the progress of the game.

Thus, a unique token object (e.g., token identification data for identifying the token) is assigned to each of the plurality types of tokens used in the video distribution system 1. By using the token identification data (see ST314) included in the token data received from the terminal device 10 of each viewer via a distribution server device system 20, the terminal device 10A of the distributor A can specify an appropriate token object to display, from among the token objects assigned to each of the plurality types of tokens.

Returning to FIG. 10, in ST1008, the terminal device 10A executes a second unit section of the game. Additionally, the execution of the second unit section may be started when the distributor A executes at least one operation (e.g., an operation of clicking the start button and/or an operation of touching the own game object 504) via the user interface unit 150. When the second unit section is executed, the distributor A can move again the own game object 504 only once, for example, via the user interface unit 150 of the terminal device 10A. The operations for the distributor A to be able to execute in order to move the own game object 504 are as described in ST1000.

In the second unit section, all the token objects displayed in the first time section (token objects illustrated in FIG. 9) can be displayed as they are in an embodiment. In an embodiment, when the own game object 504 interacts with (e.g., contacts) at least any one of these displayed token objects, the distributor A can acquire a score (point) and/or a parameter corresponding to the token object thus interacted. Hence, the distributor can move the own game object 504 so as to be able to interact with more token objects and/or while attempting to drop a ball 506C into a pocket 508C.

Additionally, in an embodiment, when the own game object 504 interacts with a token object displayed in the second video 500, the distributor A can acquire a score corresponding to the token object (token identification data). Thus, the distributor A can acquire a higher score (point) by causing the own game object 504 to interact with more token objects.

In another embodiment, when the own game object 504 interacts with a token object displayed in the second video 500, the own game object 504 can acquire a parameter corresponding to the token object (token identification data). This parameter can include the offensive power, the defensive power, the physical power, the mobile power, the equipment, and/or items of the own game object 504. Thus, the distributor A can acquire a higher score (point) by causing the own game object 504 to interact with more token objects.

Furthermore, the values of such scores (points) and/or parameters can be set on the basis of the given token (token identification data). Specifically, for example, in a phase of giving a token to the distributor A by using his/her terminal device 10C, a viewer C can select a desired token from among a plurality of prepared tokens. A point (token point) corresponding to each of the plurality of tokens is set and displayed on the token. In an embodiment, the token point corresponding to a token can be a point based on the purchase price of the token (the purchase price itself of the token or a point proportional to the purchase price of the token). In another embodiment, each viewer can obtain a point (also referred to as "My Point") each time he/she views the second video (may be the first video) distributed by the distributor. Each viewer can select a desired free token from among a plurality of prepared free tokens, and acquire the desired free token by consuming My Point held by the viewer. Therefore, in this case, the token point corresponding to a token can be a point based on the number of My Point consumed in acquiring the token (the number of My Points itself consumed in acquiring the token or a point proportional to the number of My Points).

The terminal device 10A of the distributor A having received the token data from the viewer C can read, from the storage unit 140, the token point corresponding to the token identification data included in the token data, and set the score (point) acquired by the distributor A and/or the parameter described above of the own game object 504 on the basis of the read token point (so as to be proportional to the token point, for example).

In ST1010, in parallel with such operation of the distributor A, e.g., in parallel with execution of the second unit section by the terminal device 10A, the terminal device 10A can receive, via the distribution server system 20A, token data (by the method described above with reference to FIGS. 5A and 5B) from the terminal device 10 of each viewer viewing the second video 500. However, the game object based on such token data is not displayed in the second video 500 (except for the comment 516 illustrated in FIG. 7) while the second unit section is being executed.

Next, in ST1012, when the distributor A executes the series of operations described above (at least one operation), the own game object 504 can move from the position illustrated in FIG. 9 (or FIG. 8) to a new position not illustrated and stop at that position. Thus, at the time point when the own game object 504 stops at the new position, the terminal device 10A ends the execution of the second unit section.

After this, until the game is over, the terminal device 10A can repeat in ST1016 the operation of executing an M-th unit section (where M is a natural number equal to or greater than 3) and displaying, in the second video in the M-th time section, the game object based on the token data received during the execution of the M-th unit section.

In this manner, when each viewer viewing the second video 500 transmits the token data to the distributor, the game object based on the token data is displayed as a game object that can affect the own game object 504 in the second video 500 viewed by the distributor and each viewer. This allows each viewer to affect the success or failure of the game played by the distributor by transmitting the token data to the distributor, and hence the viewer can have a sense of being involved in the game. Furthermore, by each viewer selecting a token with a higher token point (price, for example) as a token to give to the distributor, the game object set on the basis of the height of the token point affects (have a greater impact on the success or failure of the game) the own game object. This allows each viewer to have a sense of being involved in the game more strongly.

Furthermore, the terminal device 10A of the distributor A can collectively display game objects based on the token data received during the execution of a unit section in the game in the second video 500 in the time section occurring after the unit section, not displaying them in the second video 500 in the unit section. This allows the terminal device 10A to suppress the situation where the execution of the unit section (e.g., playing of the game by the distributor A) is hindered by the game object based on the received token data.

Specifically, when the distributor A moves the own game object 504 by bringing his/her finger into contact with the touch screen in, for example, ST1000 (FIG. 7) and ST1008 (FIG. 9) during the execution of the unit section, for example, if the game object based on the token data received from each viewer in the unit section is displayed in the second video 500 in a real time manner, there is a possibility of occurrence of an inconvenience such as that an interaction unintended by the user occurs between the moved game object based 504 and a game object based on suddenly appeared token data, and that at least a part of the important game object is hidden by the game object based on the suddenly appeared token data being displayed over the important game object accompanying scrolling of the screen in particular. However, according to the technology disclosed in the present application, the terminal device 10A of the distributor A can collectively display game objects based on the token data received during the execution of a unit section in the game in the second video 500 in the time section occurring after the unit section, not displaying them in the second video 500 in the unit section. This can suppress the possibility of occurrence of such an inconvenience. The display restriction to the game object based on such token data is particularly useful in mobile phones, smartphones, and the like in which an important game object and a game object (token object) based on token data become highly likely to overlap due to the small size of the display (low resolution).

Furthermore, in general, in a case where a game program is installed in the terminal device 10 or in a case where a game program is incorporated in a video distribution application installed in the terminal device 10, it is necessary to install a new game program or a video distribution application incorporating the new game program in the terminal device 10 in order to execute the new game. In this case, from the point of view of the creator of the game program, it is necessary to prepare a game program corresponding to each of a plurality of operating systems, and thus there is a problem of an increase in the man-hour required for the creation of the game program. On the other hand, from the point of view of the user, it is necessary to download a new game program and/or to update an existing game program in order to obtain a new game, and thus there is a problem of requiring communication load, communication cost, time, and labor.

On the other hand, according to the technology disclosed in the present application, in order to execute the game, the terminal device 10 of the distributor calls the browser function incorporated in the video distribution application, instead of executing the game program installed in the terminal device 10, receives a web page (HTML document, particularly HTML5 document) from the web server device 20B by using this browser function, and executes the game program incorporated in the web page. This allows the terminal device 10 of the distributor to easily execute the new game. Therefore, when providing a new game, the creator of the game program only has to incorporate the new game program into the web page (HTML document, particularly HTML5 document) transmitted by the web server device 20B, and it is hence possible to reduce the number of man-hours required for creation of the new game program. Furthermore, since the user does not need to download a new game program or the like in order to be provided with the new game, it is possible to suppress communication load, communication cost, time, and labor.

5-2. Second Example

Figure 11:
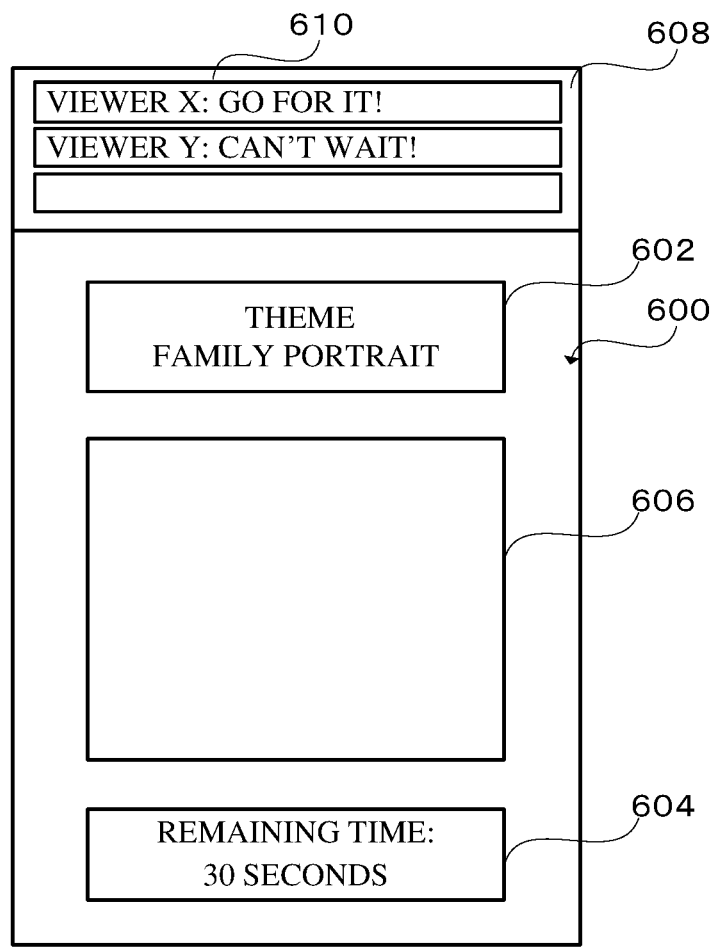
FIG. 11 is a schematic view showing another example of the second video displayed on the display unit of the terminal device when the first unit section of the game is being executed by the terminal device shown in FIG. 1.
Figure 12:
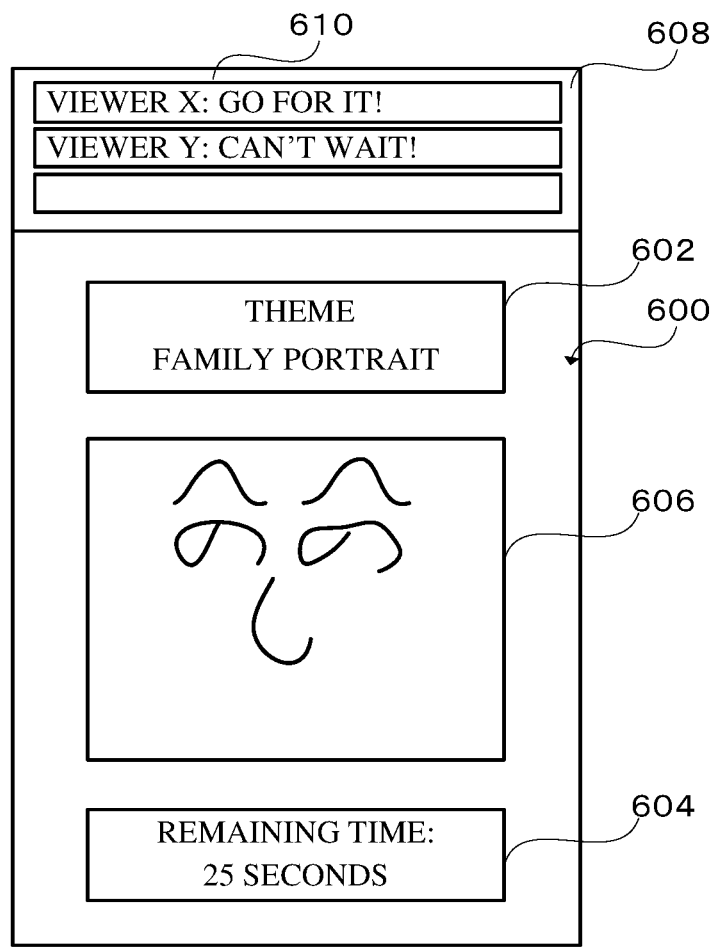
FIG. 12 is a schematic view showing still another example of the second video displayed on the display unit of the terminal device when the first unit section of the game is being executed by the terminal device shown in FIG. 1.
Figure 13:
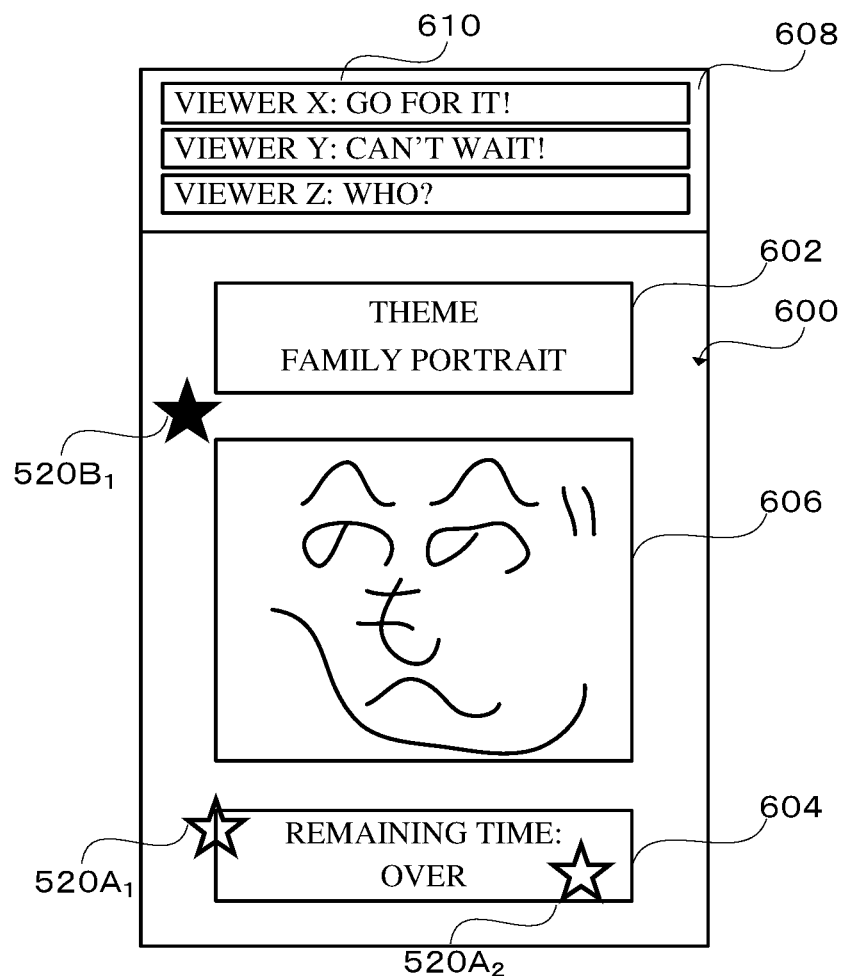
FIG. 13 is a schematic view showing another example of the second video displayed on the display unit of the terminal device at the time point when the first unit section of the game is ended by the terminal device shown in FIG. 1.
Figure 14:
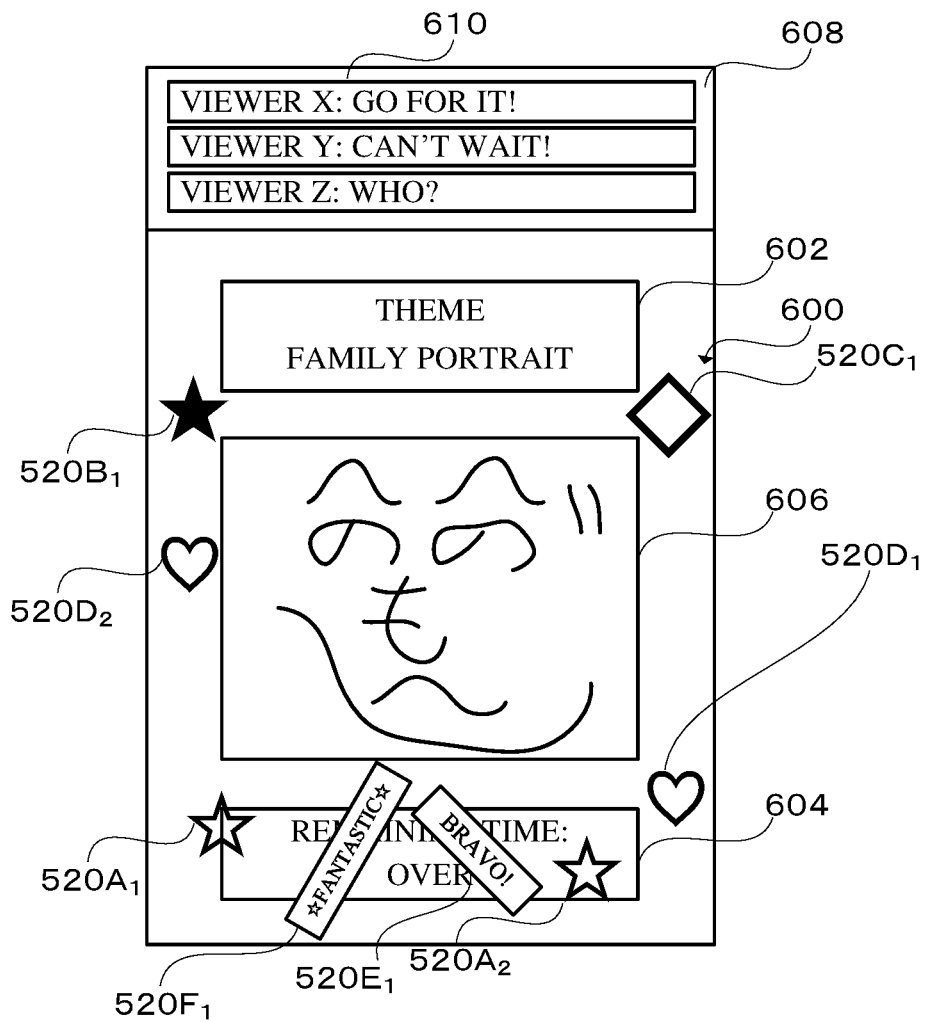
FIG. 14 is a schematic view showing another example of the second video displayed on the display unit of the terminal device when the first time section of the game is being executed by the terminal device shown in FIG. 1.

FIG. 11 is a schematic view showing another example of the second video displayed on the display unit of the terminal device 10A when the first unit section of the game is being executed by the terminal device 10A shown in FIG. 1. FIG. 12 is a schematic view showing still another example of the second video displayed on the display unit of the terminal device 10A when the first unit section of the game is being executed by the terminal device 10A shown in FIG. 1. FIG. 13 is a schematic view showing another example of the second video displayed on the display unit of the terminal device 10A at the time point when the first unit section of the game is ended by the terminal device 10A shown in FIG. 1. FIG. 14 is a schematic view showing another example of the second video displayed on the display unit of the terminal device 10A when the first time section of the game is being executed by the terminal device 10A shown in FIG. 1.

The game to be explained here is one in which the distributor A draws a picture in an area 606 within the time limit displayed in an area 604 in accordance with a theme displayed in an area 602 as illustrated in FIG. 11.

Also in this example, FIG. 10 used in the first example is referred to in a similar manner. Additionally, the detailed description of the matters common to the first example in the second example will be omitted.

First, in ST1000 shown in FIG. 10, the terminal device 10 A of the distributor A executes the first unit section of the game. Additionally, the execution of the first unit section may be started when the distributor A executes at least one operation (e.g., an operation of clicking the start button and/or an operation of drawing a picture in the area 606) via the user interface unit 150. Due to this, as illustrated in FIG. 11, the terminal device 10A can display the theme in the area 602 in a second video 600 and display in the area 604 the time limit that decreases with the lapse of time. The distributor A can draw a picture in the area 606 as illustrated in FIG. 12, for example, by bringing his/her finger, a stylus, or the like into contact with the touch screen or the like and moving it.

Returning to FIG. 10, in ST1002, in parallel with such operation of the distributor A, e.g., in parallel with execution of the first unit section by the terminal device 10A, the terminal device 10A can receive, via the distribution server system 20A, token data (by the method described above with reference to FIGS. 5A and 5B) from the terminal device 10 of each viewer viewing the second video 500. However, the game object based on such token data is not displayed in the second video 500 (except for a comment 610 illustrated in an area 608 of FIG. 12) while the first unit section is being executed. Additionally, the comment 610 displayed in the area 608 can be displayed in a similar manner to that described above in relation to the first example.

Next, in ST1004, when the time limit runs out, the terminal device 10A ends the execution of the first unit section. Next, in ST1006, the terminal device 10A can display the game object based on the token data received during the execution of the first unit section, on the second video 600 in the first time section occurring after the first unit section. Specifically, as illustrated in, for example, FIG. 13, the two types of token objects 520A and 520B, for example, can be displayed in the second video 600 in the first time section. In the example shown in FIG. 13, as the first type of token object 520A, the two token objects 520A1 and 520A2 having a shape resembling an outlined star are displayed. As the second type of token object 520B, the one token object 520B1 having a shape resembling a blackened star is displayed.

Furthermore, in an embodiment, the terminal device 10A can display, in the second video 600 in the first time section, the game object (real-time token object) based on the token data (real-time token data) received during the execution of the first "time section".

Specifically, as illustrated in FIG. 14, for example, as for the real-time token object, the one token object 520C1 having a shape resembling an outlined diamond is displayed as the third type of token object 520C. Furthermore, as the fourth type of token object 520D, the two token objects 520D$_1$ and 520D$_2$ having a shape resembling an outlined heart are displayed. As the fifth type of token object 520E, one token object 520E1 having a text "Bravo!" is displayed. As the sixth type of token object 520F, the one token object 520F1 having a text "☆Fantastic☆" is displayed. Additionally, seven or more types of token objects 520 may be displayed.

Such token objects can be displayed in an area between a plurality of important game objects so that the token object does not overlap the plurality of game objects important for the progress of the game displayed in the second video 600. The plurality of important game objects includes the area 602 and the area 606 illustrated in FIGS. 13 and 14.

Returning to FIG. 10, after this, until the game is over, the terminal device 10A can repeat in and after ST1008 the operation of executing an L-th unit section (where L is a natural number equal to or greater than 2) and displaying, in the second video in the L-th time section, the game object based on the token data received while the L-th unit section (and moreover, the L-th "time section") is being executed.

Additionally, in an embodiment, when the token object is displayed in the second video 600, the distributor A can acquire a score corresponding to the token object (token identification data). Thus, the distributor A can acquire a higher score (point) by receiving more token data from the viewer.

In another embodiment, when the token object is displayed in the second video 600, the distributor A can acquire a parameter corresponding to the token object (token identification data). The parameter can include the number of colors that can be expressed in a picture drawn in an area 600 and/or time to increase the time limit. Thus, the distributor A can acquire a higher score (point) by receiving more token data from the viewer.

Furthermore, the values of such scores (points) and/or parameters can be set on the basis of the given token (token identification data). Specifically, for example, in a phase of giving a token to the distributor A by using his/her terminal device 10C, a viewer C can select a desired token from among a plurality of prepared tokens. A point (token point) corresponding to each of the plurality of tokens is set and displayed on the token. In an embodiment, the token point corresponding to a token can be the purchase price of the token. In another embodiment, each viewer can obtain a point (also referred to as a "my point") each time he/she views the second video (may be the first video) distributed by the distributor. Each viewer can select a desired free token from among a plurality of prepared free tokens, and acquire the desired free token by consuming My Point held by the viewer. Therefore, in this case, the token point corresponding to a token can be the number of My Point consumed in acquiring the token.

The terminal device 10A of the distributor A having received the token data from the viewer C can read, from the storage unit 140, the token point corresponding to the token identification data included in the token data, and set the score (point) acquired by the distributor A and/or the parameter described above of the own game object 504 on the basis of the read token point (so as to be proportional to the token point, for example).

In this manner, when each viewer viewing the second video 600 transmits the token data to the distributor, the game object based on the token data is displayed as a game object that can affect the distributor in the second video 600 viewed by the distributor and each viewer. This allows each viewer to affect the success or failure of the game played by the distributor by transmitting the token data to the distributor, and hence the viewer can have a sense of being involved in the game. Furthermore, by each viewer selecting a token with a higher token point (price, for example) as a token to give to the distributor, the game object set on the basis of the height of the token point affects (have a greater impact on the success or failure of the game) the own game object. This allows each viewer to have a sense of being involved in the game more strongly.

Furthermore, the terminal device 10A of the distributor A can collectively display game objects based on the token data received during the execution of a unit section in the game (and moreover the time section occurring after this unit section) in the second video 600 in the time section occurring after the unit section, not displaying them in the second video 600 in the unit section. This allows the terminal device 10A to suppress the situation where the execution of the unit section (e.g., playing of the game by the distributor A) is hindered by the game object based on the received token data.

Specifically, when the distributor A draws a picture by bringing his/her finger into contact with the touch screen in, for example, ST1000 (FIG. 12 and the like) during the execution of the unit section, for example, if the game object based on the token data received from each viewer in the unit section is displayed in the second video 500 (in particular, the area 604 where the time limit is indicated, the area 602 where the theme is indicated, and the like) in a real time manner, there is a possibility of occurrence of an inconvenience such as that the display of the game object based on the token data suddenly appeared in the area 602 and/or the area 604 causes at least a part of the text indicating the theme and/or the text indicating the remaining time to be hidden. However, according to the technology disclosed in the present application, the terminal device 10A of the distributor A can collectively display game objects based on the token data received during the execution of a unit section in the game in the second video 600 in the time section occurring after the unit section, not displaying them in the second video 600 in the unit section. This can suppress the possibility of occurrence of such an inconvenience.

5-3. Third Example

In the third example, of the token objects based on the token data received from the viewer during the execution of the unit section in the first example or the second example, only a selected token object is displayed in the time section occurring after this unit section. Although the third example based on the first example is described here, the third example is similarly applicable to the second example.

Additionally, for the sake of simplicity of the explanation, it is assumed that a maximum of, for example, eight types of token objects (token objects A to H) are prepared as the plurality types of token objects, and for example, six types of token objects of these eight types of token objects are selected and displayed in one time section. Here, a token A is assigned with a token object A unique to the token A, a token B is assigned with a token object B unique to the token B, and similarly, tokens C to H are assigned with unique token objects C to H, respectively.

FIG. 15 is a diagram schematically showing a method of selecting a token object to be displayed in each time section in the video distribution system 1 shown in FIG. 1. As shown in FIG. 15, in the first unit section, the terminal device 10A of the distributor A receives 10, 1, 9, 1, 8, 1, 0, and 0 tokens A to H, respectively, from the terminal device 10 of any viewer (ST1002).

First, for the first unit section, among the token objects A to H, the top N types (here, three types) of token objects corresponding to the top N types of (three types) tokens to which the number of given token objects is the largest are selected as first token objects. Here, the top three types of token objects (the token objects A, C, and E) corresponding to the top three types of tokens (tokens A, C, and E), respectively, to which the number of given token objects is the largest are selected as the first token objects.

Furthermore, for the first unit section, among the token objects excluding the first token objects selected as described above, M types (here, three types) of token objects selected in accordance with the priority are selected as second token objects. The priority is determined on the basis of an identification number assigned to each of the plurality types of token objects A to H and the fact whether or not each of the token objects A to H have been selected as the first token object or the second token object in the unit section immediately before the first unit section.

In this example, among the token objects excluding the token objects A, C, and E, three types of token objects having smaller identification numbers (however, those selected as the first token object or the second token object in the unit section immediately before the first unit section are excluded) are selected as the second token objects. Specifically, the token objects B, D, and F having smaller identification numbers are selected as the second token objects. Additionally, the order of the identification numbers A to H is considered to be an ascending order (in another embodiment, the order of the identification numbers A to H can be considered to be a descending order).

As a result, in the first time section occurring after the first unit section, the terminal device 10A displays the ten token objects A, the nine token objects C, and the eight token objects E as the first token objects and displays the one token object B, the one token object D, and the one token object F as the second token objects in the second video (ST1006).

Next, in the second unit section, the terminal device 10A of the distributor A receives 8, 9, 10, 1, 1, 1, 1, and 1 tokens A to H, respectively, from the terminal device 10 of any viewer (ST1010).

First, for the second unit section, among the token objects A to H, the top N types (here, three types) of token objects corresponding to the top N types of (three types) tokens to which the number of given token objects is the largest are selected as first token objects. Here, the top three types of token objects (the token objects A, B, and C) corresponding to the top three types of tokens (tokens A, B, and C), respectively, to which the number of given token objects is the largest are selected as the first token objects.

Furthermore, for the second unit section, of the token objects excluding the first token objects selected as described above, M types (here, three types) of token objects selected in accordance with the priority are selected as second token objects.

In this example, among the token objects excluding the token objects A, B, and C, three types of token objects having smaller identification numbers (however, those selected as the first token object or the second token object in the first unit section immediately before the second unit section are excluded) are selected as the second token objects. Specifically, in the first unit section, the token objects D, E, and F have already been selected as the first token object or the second token object. Hence, first, the token objects G and H are selected as the second token objects. As the remaining one type of the second token object, the token object D, which has the smallest identification number of the remaining token objects D, E, and F, is selected.

As a result, in the second time section occurring after the second unit section, the terminal device 10A displays the eight token objects A, the nine token objects B, and the ten token objects C as the first token objects and displays the one token object G, the one token object H, and the one token object D as the second token objects in the second video (ST1014).

Here, one token E and one token F of the tokens received by the terminal device 10A in the second unit section are not displayed in the second time section. In an embodiment, a token thus given in the second unit section, the token corresponding to a non-displayed token object not displayed as the first token object or the second token object in the second time section, can be carried over as a token given in the third unit section occurring after the second unit section.

Next, in the third unit section, the terminal device 10A of the distributor A receives 1, 1, 1, 10, 1, 1, 0, and 0 tokens A to H, respectively, from the terminal device 10 of any viewer (ST1016). However, as mentioned above, tokens (one token E and one token F) given in the second unit section, the tokens corresponding to non-displayed token objects not displayed in the second time section, are carried over as tokens given in the third unit section. Hence, finally, in the third unit section, the terminal device 10A of the distributor A receives 1, 1, 1, 10, 2 (one of which was carried over from the second unit section), 2 (one of which was carried over from the second unit section), 0, and 0 tokens A to H, respectively, from the terminal device 10 of any viewer.

First, for the third unit section, among the token objects A to H, the top N types (here, three types) of token objects corresponding to the top N types of (three types) tokens to which the number of given token objects is the largest are selected as first token objects. Here, the top three types of token objects (the token objects D, E, and F) corresponding to the top three types of tokens (tokens D, E, and F), respectively, to which the number of given token objects is the largest are selected as the first token objects.

Furthermore, for the third unit section, among the token objects excluding the first token objects selected as described above, M types (here, three types) of token objects selected in accordance with the priority are selected as second token objects.

In this example, among the token objects excluding the token objects D, E, and F, three types of token objects having smaller identification numbers (however, those selected as the first token object or the second token object in the second unit section immediately before the third unit section are excluded) are selected as the second token objects. Specifically, in the second unit section, the token objects A, B, C, G, and H all have already been selected as the first token object or the second token object. Hence, of these remaining token objects A, B, C, G, and H, the three types of token objects A, B, and C having the smallest identification numbers are selected as the second token objects.

As a result, in the third time section occurring after the third unit section, the terminal device 10A displays the ten token objects D, the two token objects E, and the two token objects F as the first token objects and displays the one token object A, the one token object B, and the one token object C as the second token objects in the second video (ST1016).

In this way, among the token objects based on the token data received from the viewer during the execution of the unit section, only a selected token object can be displayed in the time section occurring after this unit section. This causes a large number of token objects to be displayed in the second video, thereby making it possible to suppress a situation that the board of the game is unnaturally filled with the large number of token objects and becomes difficult to see and/or that a high load is applied to a CPU 11 of the terminal device 10A of the distributor A to hinder the progress of the game. Furthermore, it is also possible to suppress the situation that the identical type of token object is continuously displayed many times.

Furthermore, a token given in a certain unit section, the token corresponding to a non-displayed token object not displayed in a time section occurring immediately after this unit section is carried over as a token given in a next unit section occurring immediately after the above time section. Thus, the token object corresponding to the token given to the distributor A by each viewer is surely displayed in the second video at least as the second token object when time elapses (sometimes displayed as the first token object). Therefore, the act of giving a token by each viewer is always rewarded by the fact that the token object corresponding to the token is surely displayed in the second video.

5-4. Fourth Example

If the terminal device 10A of the distributor A receives a "plurality" of pieces of certain specific type of token data from the terminal device 10 of at least one viewer in ST1002 (or ST1010) shown in, for example, FIG. 10, the terminal device 10A of the distributor A can display the token objects corresponding to the specific type of token data in the second video in an embodiment in ST1006 (or ST1014) so as not to overlap the "plurality" of token objects with one another (e.g., as illustrated in FIG. 9, the token objects 520C₁ and 520C₂ can be displayed so that they do not overlap with each other in the second video 500). In this case, there is a possibility that as the total number of token objects corresponding to the specific type of token data increases, the progress of the game is hindered by displaying a large number of the token objects.

Therefore, the terminal device 10A of the distributor A can integrate the plurality of identical token objects in various aspects in accordance with the total number of the plurality of token objects for display in the second video.

Figure 16:
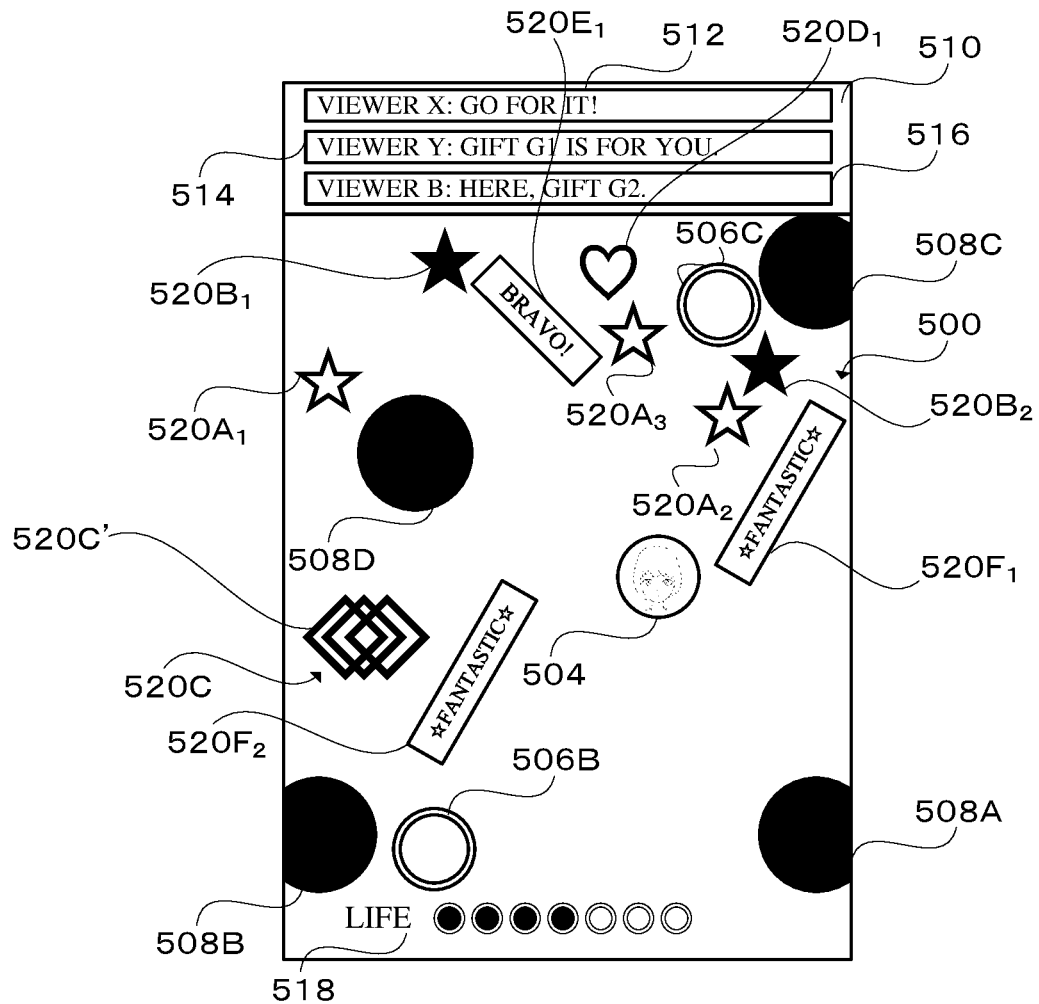
FIG. 16 is a schematic view showing another example of the second video displayed on the display unit of the terminal device when the first time section of the game is being executed by the terminal device shown in FIG. 1.

FIG. 16 is a schematic view showing still another example of the second video displayed on the display unit of the terminal device 10A shown in FIG. 1. Here, the total number of the plurality of identical token objects is referred to as a "total number of objects" for convenience.

First, as a first aspect, it is possible to use an aspect in which as many a certain representative token object as the "total number of objects" overlaps. As illustrated in FIG. 16, for example, when three target token objects 520C are displayed (the total number of objects is 3), the three identical token objects 520C are displayed in an aspect in which certain representative token objects 520C' are overlapped by the total number of objects (here, three). While here, as an example, the representative token object 520C' is identical to each token object 520C, the representative token object 520C' may be an object in which the token object 520C is deformed (enlarged, reduced, rotated, inverted, excerpted, or the like), or may be one in which the token object 520C is expressed by text and/or a symbol.

As a second aspect, it is possible to use an aspect in which the token object is expressed by a combination of a certain representative token object and a text indicating the total number of objects. In the example shown in FIG. 16, for example, when 98 token objects 520C are displayed (the total number of objects is 98), the 98 identical token objects 520C are expressed by a combination of a certain representative token object 520C' and text indicating the total number (here, 98) of objects ("98", "x98", or the like). While here, as an example, the representative token object 520C' is identical to each token object 520C, the representative token object 520C' may be an object in which the token object 520C is deformed (enlarged, reduced, rotated, inverted, excerpted, or the like), or may be one in which the token object 520C is expressed by text and/or a symbol.

As a third aspect, it is possible to use an aspect in which a certain representative token object is expressed by a density corresponding to the total number of objects. For example, the density of the color given to the representative token object can be set to be high (or low) in proportion to the total number of objects. While also in this aspect, the representative token object described above can be identical to the target token object, the representative token object may be one in which the target token object is deformed (enlarged, reduced, rotated, inverted, excerpted, or the like), or may be one in which the target token object is expressed by text and/or a symbol.

As a fourth aspect, it is possible to use an aspect in which a certain representative token object is expressed by a size corresponding to the total number of objects. For example, the size of the representative token object can be set to be large in proportion (or to be small in inverse proportion) to the total number of objects. While also in this aspect, the representative token object described above can be identical to the target token object, the representative token object may be one in which the target token object is deformed (enlarged, reduced, rotated, inverted, excerpted, or the like).

Additionally, the first aspect to the fourth aspect described above are applicable in the case of displaying a plurality of identical token objects in the second video, and the identical token objects can include each of the token objects 520A, 520B, 520D, 520E, and 520F illustrated in FIG. 9, without being limited thereto. Furthermore, the first aspect to the fourth aspect described above can be used in combination with one another.

Thus, the terminal device 10 of the distributor can integrate the plurality of identical token objects in various aspects in accordance with the total number of those token objects for display in the second video. This allows the terminal device 10 to at least partially suppress the situation in which the progress of the game being distributed is hindered while surely showing, on the second video, the fact that the plurality of identical tokens have been given to the distributor (e.g., the fact that each viewer has given a token to the distributor).

By displaying the plurality of token objects in the aspect in accordance with the total number of those token objects, it is possible to suppress the size occupied by the plurality of those token objects in the display unit and the calculation amount necessary for drawing and processing of the plurality of those token objects. In general, the resolution (screen size) of the display unit of the terminal device 10 of the user and the computing capability of the terminal device 10 of the user are limited, and are further limited in the order of a personal computer, a smartphone, and a feature phone. Hence, displaying a plurality of token objects in the aspect in accordance with the total number of those token objects is particularly important in the terminal device 10 having such limited resolution and computing capability.

6. Variations

The unit section executed by the terminal device 10A of the distributor A can include from a time point when the progress of the game is started by the distributor A executing at least one operation to a time point when the progress of the game is paused. Such a unit section may be selected from a group including at least one action, at least one scene, at least one scenario, at least one stage, at least one area/round/phase/level/map/act/world, at least one game, and a combination of these.

The game distributed as the second video may be a shooter game, a sports game, a role-playing game, an action game, a simulation game, a social simulation game, and/or a puzzle game, as long as it is a game that can repeat the unit section and the unit time at least once.

The description of the various embodiments described above has presented the case where an HTML (particularly HTML5) document in which a game program is incorporated is received from the web server device 20B in order for the terminal device 10 of the distributor to generate a video (second video) related to the game. However, the terminal device 10 of the distributor can generate the second video including a screen related to the game by executing the installed video delivery application and receiving necessary data from a data server device not shown (or any server device not shown included in the distribution server system 20A), in place of the configuration in which an HTML document in which a game program is incorporated from the web server device 20B is received from the web server device 20B.

In the various embodiments described above, the terminal device 10 of the distributor may be a smartphone or the like used by a general user, or may be a dedicated terminal device installed in a studio or the like. In this case, at least one server device of the distribution server device 20a, the DB server device 20b, and the game API server device 20c that are included in the distribution server system 20A (as well as the web server device 20B) may be provided together with the dedicated terminal device in the studio or the like.

The description of the various embodiments described above has presented the case where the terminal device 10 of the distributor generates the first video including an animation of the first avatar of the distributor on the basis of motion data related to the motion of the distributor and the voice data related to the voice of the distributor, and transmits the first video to the distribution server device 20a. However, the terminal device 10 of the distributor may transmit motion data related to the motion of the distributor and voice data related to the voice of the distributor to the distribution server device 20a, and the distribution server device 20a may generate the first video on the basis of the motion data and the voice data and distribute the first video to the terminal device 10 of each viewer. Alternatively, the terminal device 10 of the distributor may transmit motion data related to the action of the distributor and voice data related to the voice of the distributor to a separately provided server device, the separate server device may generate the first video on the basis of the motion data and the voice data and return the first video to the terminal device 10 of the distributor, and the terminal device 10 of the distributor may transmit the received first video to the distribution server device 20a. Furthermore, the terminal device 10 of the distributor may transmit motion data related to the action of the distributor and voice data related to the voice of the distributor to the terminal device 10 of each viewer via the distribution server device 20a or the separately provided server device, and the terminal device 10 of each viewer may generate (render) and display the first video on the basis of the received motion data and voice data.

In any of the above cases, the generation of the first video on the basis of the motion data and the voice data transmitted by the terminal device 10 of the distributor may be shared by at least two of the distribution server device 20*a*, the separate server device, and the terminal device 10 of each viewer. In any case, the device in charge of generation of the first video can receive data (images and the like) related to the avatar to act from, for example, the distribution server device 20*a* and store the data.

Furthermore, in any case, the token data and/or comment data transmitted by the terminal device 10 of each viewer can be transmitted by a given method to the device in charge of generation of the first video among the distribution server device 20*a*, the separate server device, and the terminal device 10 of each viewer. This allows the device that generates the first video to execute processing based on the received token data (e.g., displaying a token object on a first video) and/or to execute processing based on the received comment data (e.g., displaying a comment on the first video). In any case, the device in charge of generation of the first video can receive data (images and the like) corresponding to various tokens to be used from, for example, the distribution server device 20*a* and store the data.

The description of the various embodiments described above has presented the case where the comment data is transmitted from the terminal device 10 of the viewer to the terminal device 10 of the distributor via the distribution server system 20A in the form of being incorporated into the token data. However, the comment data may be transmitted to the terminal device 10 of the distributor separately from the token data. In this case, a configuration equivalent to the DB server device 20*b* and the game API server device 20*c* described above used for transmission of the token data can be separately provided for the purpose of transmission of the comment data.

In the various embodiments described above, when executing the video distribution application and communicating with the distribution server system 20A to distribute the first video, the terminal device 10A of the distributor A executes the browser function incorporated in the video distribution application, whereby the terminal device 10A can execute a program included in the web page received from the web server device 20B and distribute the second video to the terminal device 10 of each viewer via the distribution server system 20A. However, such configuration is merely an example.

For example, the terminal device 10A of the distributor A can also distribute the second video without distributing the first video. Specifically, in the first example, by executing the video distribution application and executing the browser function incorporated in the video distribution application, the terminal device 10A of the distributor A can execute a program included in the web page received from the web server device 20B (without distributing the first video by using the video distribution application), and distribute the second video to the terminal device 10 of each viewer via the distribution server system 20A. With this configuration, it is possible for the distributor A not to distribute the first video based on the performance of himself/herself but to distribute only the second video showing the state of the game executed by himself/herself.

In the second example, by executing an installed game application and accessing the distribution server system 20A, which also functions as a game server device, the terminal device 10A of the distributor A can distribute the screen of the game being executed to the terminal device 10 of each viewer via the distribution server system 20A.

In the third example, the terminal device 10A of the distributor A can transmit operation data of the distributor A to the web server device 20B or the distribution server system 20A without generating a game screen in the above-mentioned first example or the second example. In this case, the web server device 20B or the distribution server system 20A can generate a game screen by using the operation data of the distributor, and the distribution server system 20A can distribute the second video including the generated game screen to the terminal device 10 of each viewer.

Since the distribution server system 20A holds token data and/or comment data transmitted from each viewer to the distributor, the second video can be generated by using token data and/or comment data and the operation data by a technique similar to that performed by the terminal device 10 of the distributor. On the other hand, the web server device 20B does not hold token data and/or comment data transmitted from each viewer to the distributor. Therefore, the web server device 20B can acquire token data and/or comment data held by the distribution server system 20A from the distribution server system 20A, and can generate a second video by using this token data and/or comment data and the operation data. The web server device 20B can receive token data and/or comment data from the distribution server system 20A by using the above-described method performed by the terminal device 10 of the distributor with the distribution server system 20A.

The method of generating the second video by the web server device 20B or the distribution server system 20A can be the same as the method of generating the second video described above by the terminal device 10 of the distributor.

The various embodiments described above can be used in combination with one another as long as no contradiction or inconvenience occurs.

7. Example Computing Environment

Figure 17:
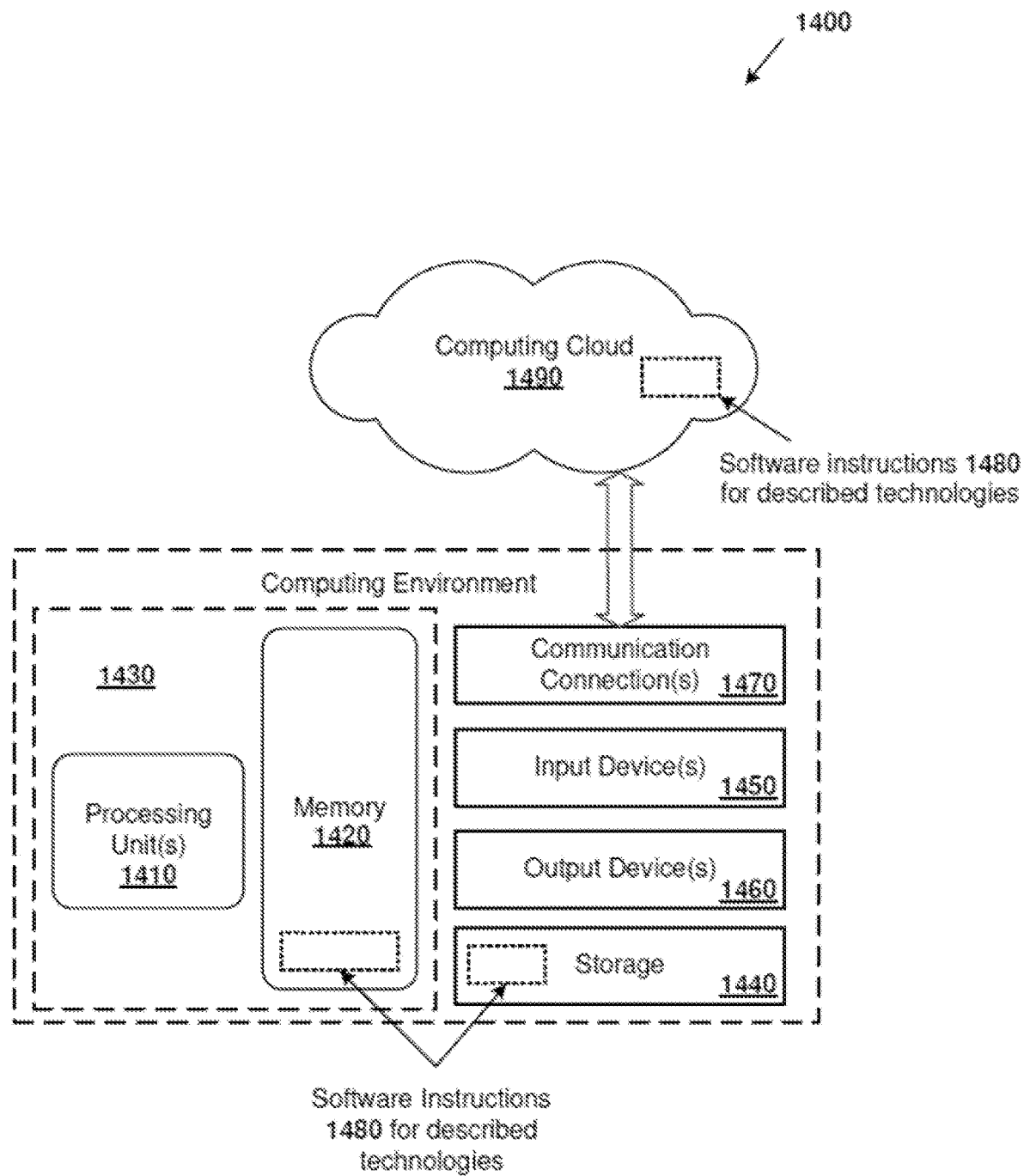
FIG. 17 is a diagram outlining an example computing environment in which disclosed methods and apparatus can be implemented.

FIG. 17 illustrates a generalized example of a suitable computing environment 1400 in which described embodiments, techniques, and technologies, including transmitting and using tokens to render video in a computing environment, can be implemented. For example, the computing environment 1400 can implement any of the terminal devices (or distributors or viewers) or the distribution server system, etc., as described herein.

The computing environment 1400 is not intended to suggest any limitation as to scope of use or functionality of the technology, as the technology may be implemented in diverse general-purpose or special-purpose computing environments. For example, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 17, the computing environment 1400 includes at least one central processing unit 1410 and memory 1420. In FIG. 17, this most basic configuration 1430 is included within a dashed line. The central processing unit 1410 executes computer-executable instructions and may be a real or a virtual processor. In a multi-processing system, multiple processing units execute computer-executable instructions to increase processing power and as such, multiple processors can be running simultaneously. The memory 1420 may be volatile memory (e.g., registers, cache, RAM), non-volatile memory (e.g., ROM, EEPROM, flash memory, etc.), or some combination of the two. The memory 1420 stores software 1480, images, and video that can, for example, implement the technologies described herein. A computing environment may have additional features. For example, the computing environment 1400 includes storage 1440, one or more input devices 1450, one or more output devices 1460, and one or more communication connections 1470. An interconnection mechanism (not shown) such as a bus, a controller, or a network, interconnects the components of the computing environment 1400. Typically, operating system software (not shown) provides an operating environment for other software executing in the computing environment 1400, and coordinates activities of the components of the computing environment 1400.

The storage 1440 may be removable or non-removable, and includes magnetic disks, magnetic tapes or cassettes, CD-ROMs, CD-RWs, DVDs, or any other medium which can be used to store information and that can be accessed within the computing environment 1400. The storage 1440 stores instructions for the software 1480, plugin data, and messages, which can be used to implement technologies described herein.

The input device(s) 1450 may be a touch input device, such as a keyboard, keypad, mouse, touch screen display, pen, or trackball, a voice input device, a scanning device, or another device, that provides input to the computing environment 1400. For audio, the input device(s) 1450 may be a sound card or similar device that accepts audio input in analog or digital form, or a CD-ROM reader that provides audio samples to the computing environment 1400. The output device(s) 1460 may be a display, printer, speaker, CD-writer, or another device that provides output from the computing environment 1400.

The communication connection(s) 1470 enable communication over a communication medium (e.g., a connecting network) to another computing entity. The communication medium conveys information such as computer-executable instructions, compressed graphics information, video, or other data in a modulated data signal. The communication connection(s) 1470 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and destination agent data consumers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1490. For example, agents can be executing vulnerability scanning functions in the computing environment while agent platform (e.g., bridge) and destination agent data consumer service can be performed on servers located in the computing cloud 1490.

Computer-readable media are any available media that can be accessed within a computing environment 1400. By way of example, and not limitation, with the computing environment 1400, computer-readable media include memory 1420 and/or storage 1440. As should be readily understood, the term computer-readable storage media includes the media for data storage such as memory 1420 and storage 1440, and not transmission media such as modulated data signals.

In view of the many possible embodiments to which the principles of the disclosed subject matter may be applied, it should be recognized that the illustrated embodiments are only preferred examples and should not be taken as limiting the scope of the scope of the claims to those preferred examples. Rather, the scope of the claimed subject matter is defined by the following claims. We therefore claim as our invention all that comes within the scope of these claims.

What is claimed is:

1. Non-transitory computer-readable storage media storing computer-readable instructions, which when executed by a computer having at least one processor, cause the computer to:
   distribute, toward a terminal device of a viewer via a communication line, a first video including an animation of a first avatar of a distributor generated on the basis of motion data or distribute, toward the terminal device via the communication line, the motion data, in order to cause the terminal device to generate the first video on the basis of the motion data;
   distribute, toward the terminal device of the viewer via the communication line, a second video showing a computer-implemented game generated on the basis of operation data;
   receive, from the terminal device of the viewer via the communication line, token data indicative of a token sent to the distributor from the viewer viewing the second video during execution of one unit section of the game; and
   distribute, toward the terminal device of the viewer via the communication line, the second video including, during one time section occurring after the one unit section of the game ends and before a second unit section of the game begins, a rendering of a token object selected on the basis of the token data, after distributing, during the one unit section of the game, the second video excluding the rendering of the token object.

2. The non-transitory computer-readable storage media according to claim 1, wherein the one unit section includes a period from a first time point at which the distributor executes at least one operation to start a progress of the game, to a second time point at which the game pauses.

3. The non-transitory computer-readable storage media according to claim 1, wherein the token object does not overlap a game object in the game when the token object is displayed in the second video during the one time section.

4. The non-transitory computer-readable storage media according to claim 1, wherein the token object is displayed in a region between a game object and another game object displayed in the second video.

5. The non-transitory computer-readable storage media according to claim 1, wherein the token is one of a plurality types of tokens, wherein the token object is one of a plurality types of token objects, and wherein each token of the plurality types of tokens is assigned with a token object unique to the token among the plurality types of token objects.

6. The non-transitory computer-readable storage media according to claim 5, wherein for the one unit section, among the plurality types of token objects, the top N types of token objects corresponding to the top N types of tokens sent to the distributor are determined as first objects, where N is a natural number, wherein for the one unit section, among the plurality types of token objects excluding said first objects, M types of token objects selected in accordance with priority are determined as second objects, where M is a natural number, and wherein said first and second objects are displayed in the second video during the one time section.

7. The non-transitory computer-readable storage media according to claim 6, wherein the priority is determined on the basis of an identification number assigned to each of the plurality types of token objects and whether or not each of the plurality types of token objects has been displayed as one of the first or second objects during a previous time section before the one time section.

8. The non-transitory computer-readable storage media according to claim 7, wherein for the second unit section occurring after the one unit section and the one time section, among the plurality types of token objects, the top N types of token objects corresponding to the top N types of tokens sent to the distributor are determined as new first objects, where N is a natural number, wherein for the second unit section, among the plurality types of token objects excluding said new first objects, M types of token objects selected in accordance with the priority are determined as new second objects, where M is a natural number, and wherein said new first and second objects are displayed in the second video during a next time section occurring after the second unit section.

9. The non-transitory computer-readable storage media according to claim 8, wherein among the tokens sent to the distributor during the one unit section, a token corresponding to non-displayed token which is not displayed as one of the first or second objects during the one time section is carried over as a token sent to the distributor during the second unit section.

10. The non-transitory computer-readable storage media according to claim 1, wherein the instructions further cause the computer to:
receive, from the terminal device of the viewer via the communication line, real-time token data indicative of a token sent to the distributer from the viewer viewing the second video during the one time section; and
distribute, toward the terminal device of the viewer via the communication line, the second video including, during the one time section, a rendering of a real-time token object selected on the basis of the real-time token data.

11. A terminal device, comprising:
at least one processor, wherein the at least one processor:
distributes, toward a terminal device of a viewer via a communication line, a first video including an animation of a first avatar of a distributor generated on the basis of motion data or distribute, toward the terminal device via the communication line, the motion data, in order to cause the terminal device to generate the first video on the basis of the motion data;
distributes, toward the terminal device of the viewer via the communication line, a second video showing a computer-implemented game generated on the basis of operation data;
receives, from the terminal device of the viewer via the communication line, gift data indicative of a gift sent to the distributor from the viewer viewing the second video during execution of one unit section of the game; and
distributes, toward the terminal device of the viewer via the communication line, the second video including, during one time section occurring after the one unit section of the game ends and before a second unit section of the game begins, a rendering of a gift object selected on the basis of the gift data, after distributing, during the one unit section of the game, the second video excluding the rendering of the gift object.

12. A computer-implemented method for automatically generating customized video in an interactive network application, the method comprising:
with at least one processor:
distributing, toward a terminal device of a viewer via a communication line, a first video including an animation of a first avatar of a distributor generated on the basis of motion data or distribute, toward the terminal device via the communication line, the motion data, in order to cause the terminal device to generate the first video on the basis of the motion data;
distributing, toward the terminal device of the viewer via the communication line, a second video showing a computer-implemented game generated on the basis of operation data;
receiving, from the terminal device of the viewer via the communication line, gift data indicative of a gift sent to the distributor from the viewer viewing the second video during execution of one unit section of the game; and
distributing, toward the terminal device of the viewer via the communication line, the second video including, during one time section occurring after the one unit section of the game ends and before a second unit section of the game begins, a rendering of a gift object selected on the basis of the gift data, after distributing, during the one unit section of the game, the second video excluding the rendering of the gift object.

13. The non-transitory computer-readable storage media according to claim 1, wherein the one unit section starts from a first time point at when the distributor executes at least one operation in the game to start a progress of the game, and ends at a second time point at when the game pauses.

14. The terminal device according to claim 11, wherein the one unit section starts from a first time point at when the distributor executes at least one operation in the game to start a progress of the game, and ends at a second time point at when the game pauses.

15. The computer-implemented method according to claim 12, wherein the one unit section starts from a first time point at when the distributor executes at least one operation in the game to start a progress of the game, and ends at a second time point at when the game pauses.

* * * * *